US010623032B2

(12) United States Patent
Hayashi et al.

(10) Patent No.: US 10,623,032 B2
(45) Date of Patent: Apr. 14, 2020

(54) TRANSMISSION DEVICE AND SYSTEM

(71) Applicant: SONY SEMICONDUCTOR SOLUTIONS CORPORATION, Kanagawa (JP)

(72) Inventors: Hiroaki Hayashi, Kanagawa (JP); Masatsugu Sugano, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/325,690

(22) PCT Filed: Jul. 11, 2017

(86) PCT No.: PCT/JP2017/025311
§ 371 (c)(1),
(2) Date: Feb. 14, 2019

(87) PCT Pub. No.: WO2018/051622
PCT Pub. Date: Mar. 22, 2018

(65) Prior Publication Data
US 2019/0215022 A1 Jul. 11, 2019

(30) Foreign Application Priority Data
Sep. 15, 2016 (JP) ................. 2016-180259

(51) Int. Cl.
*H04B 1/04* (2006.01)
*H04L 25/02* (2006.01)
(Continued)

(52) U.S. Cl.
CPC ............ *H04B 1/0475* (2013.01); *H04B 1/10* (2013.01); *H04B 3/231* (2013.01); *H04B 3/237* (2013.01);
(Continued)

(58) Field of Classification Search
CPC ........ H04B 1/0475; H04B 1/10; H04B 3/231; H04B 3/237; H04L 25/03878; H04L 25/03343; H04L 25/0288
See application file for complete search history.

(56) References Cited

U.S. PATENT DOCUMENTS 8,582,681 B2 * 11/2013 Shimamura ....... H04L 25/03878
375/284
2009/0225901 A1 9/2009 Shimamura et al.
(Continued)

FOREIGN PATENT DOCUMENTS

CN 102742158 A 10/2012
EP 2068518 A1 6/2009
(Continued)

OTHER PUBLICATIONS

International Search Report and Written Opinion of PCT Application No. PCT/JP2017/025311, dated Oct. 17, 2017, 8 pages of ISRWO.

*Primary Examiner* — Siu M Lee
(74) *Attorney, Agent, or Firm* — Chip Law Group

(57) ABSTRACT

There is provided a transmission device including a transmission unit that has a function of transmitting a transmission signal with a reduced influence of reflection noise in transmission data after data transition on the basis of the transmission data. The transmission device is connected to a transmission line. Also provided is a reception device connected to the transmission line. The reception device receives data transmitted from the transmission device.

14 Claims, 30 Drawing Sheets

(51) Int. Cl.
*H04B 3/23* (2006.01)
*H04L 25/03* (2006.01)
*H04B 1/10* (2006.01)

(52) U.S. Cl.
CPC .... *H04L 25/0288* (2013.01); *H04L 25/03343* (2013.01); *H04L 25/03878* (2013.01)

(56) References Cited

U.S. PATENT DOCUMENTS

| | | | |
|---|---|---|---|
| 2010/0027712 A1* | 2/2010 | Poulton | H04L 25/0272 375/295 |
| 2012/0025800 A1 | 2/2012 | Dettloff et al. | |
| 2012/0147944 A1* | 6/2012 | Amirkhany | H03K 19/0005 375/232 |
| 2014/0281753 A1 | 9/2014 | Wagh et al. | |

FOREIGN PATENT DOCUMENTS

| | | |
|---|---|---|
| JP | 2011-239091 | 11/2011 |
| JP | 2011-239091 A | 11/2011 |
| JP | 2013-504950 A | 2/2013 |
| WO | 2008/038388 A1 | 4/2008 |
| WO | 2010/111619 A2 | 9/2010 |
| WO | 2011/032178 A2 | 3/2011 |

\* cited by examiner

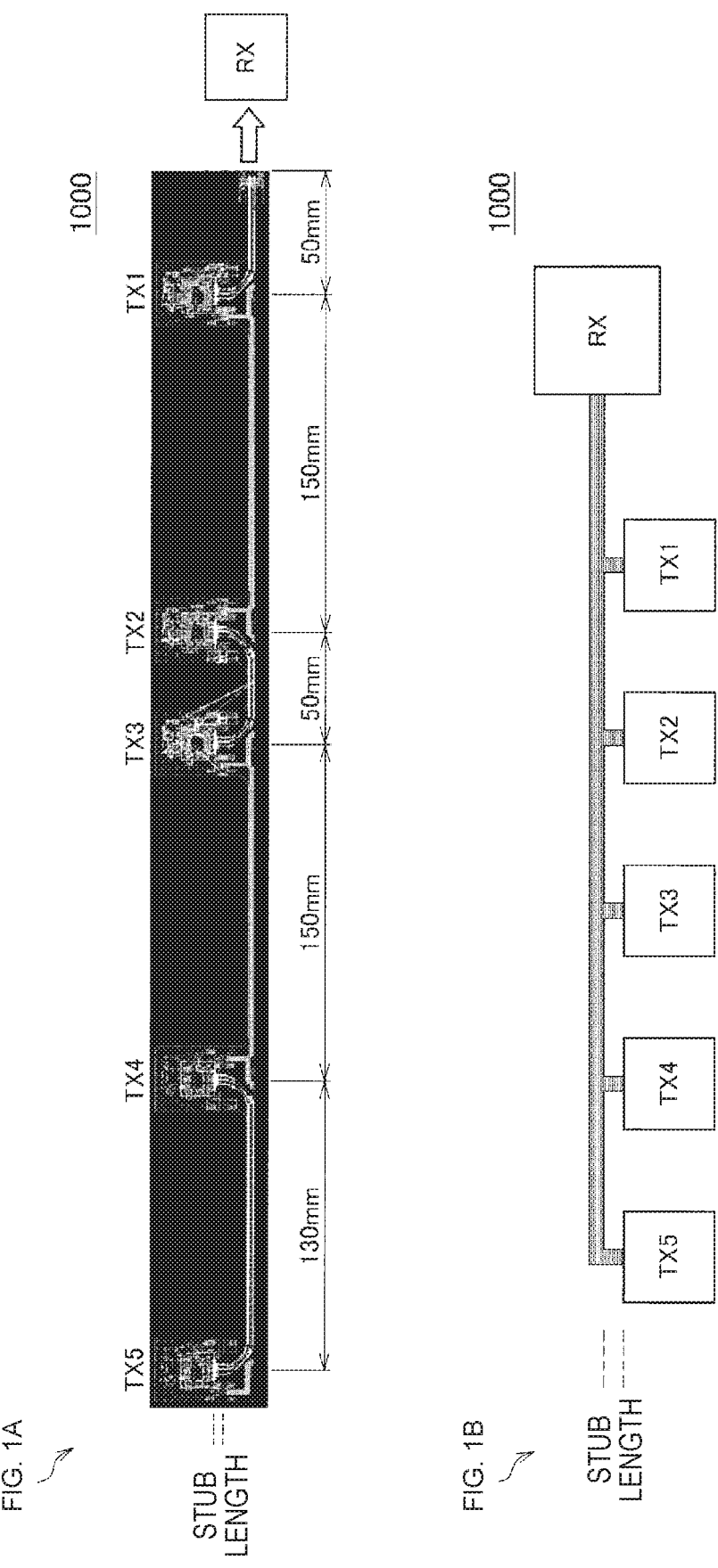

REFLECTION  OUTER SIDE ←⋮→ INNER SIDE

DEGRADATION AT PORTION DURING DATA TRANSITION

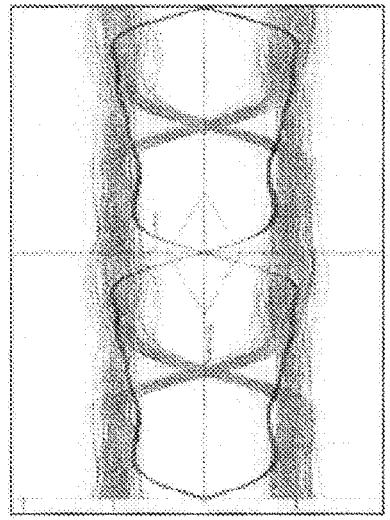
FIG. 4A
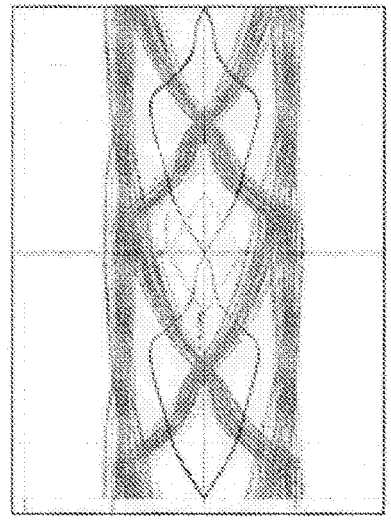
FIG. 4C
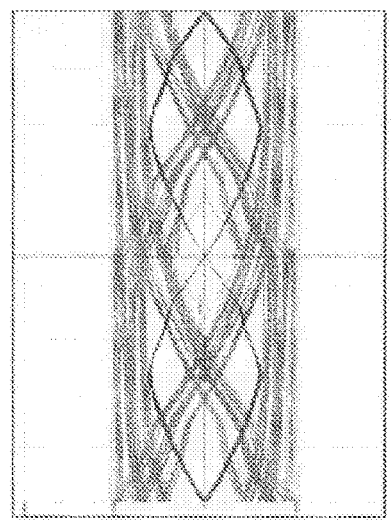
FIG. 4D
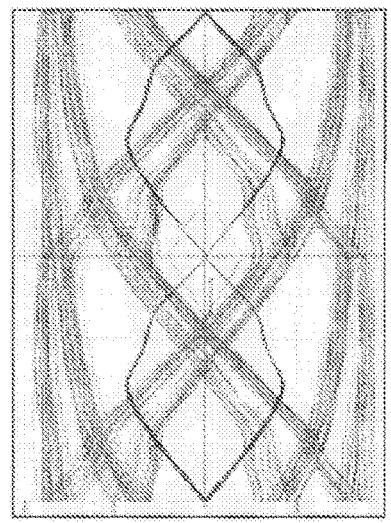
FIG. 4E
FIG. 4B

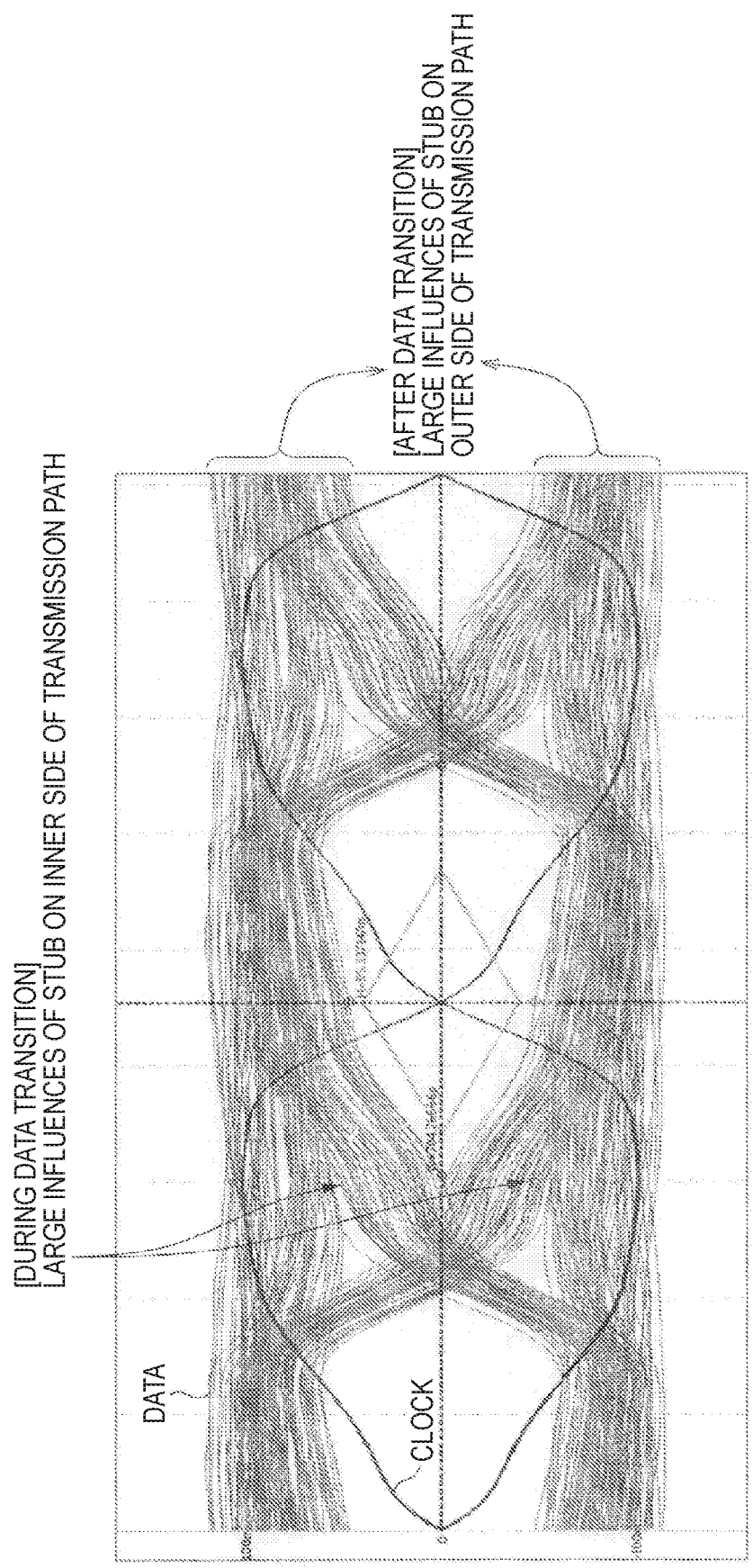

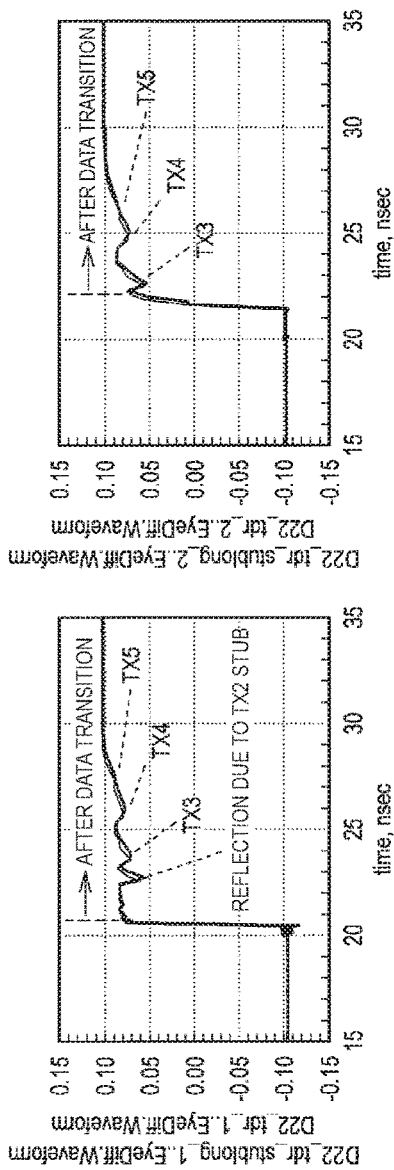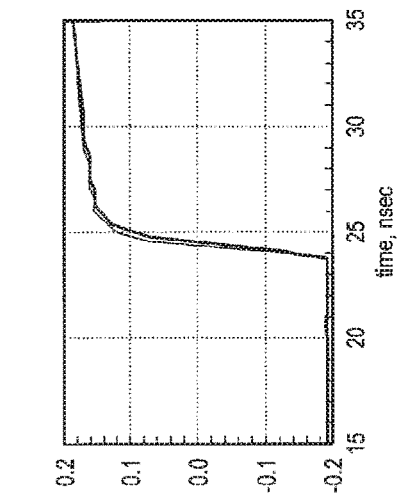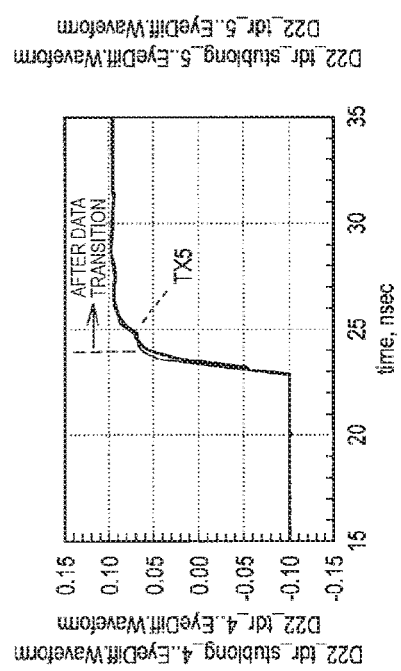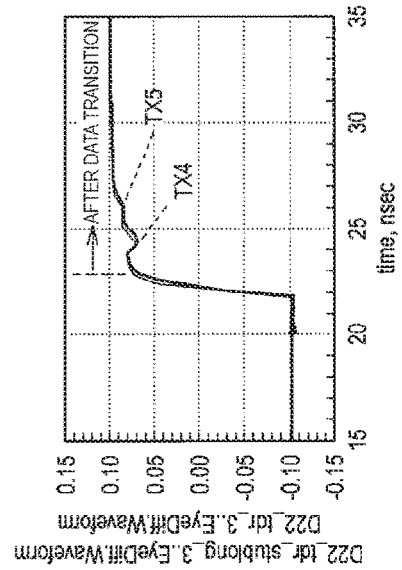

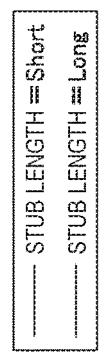
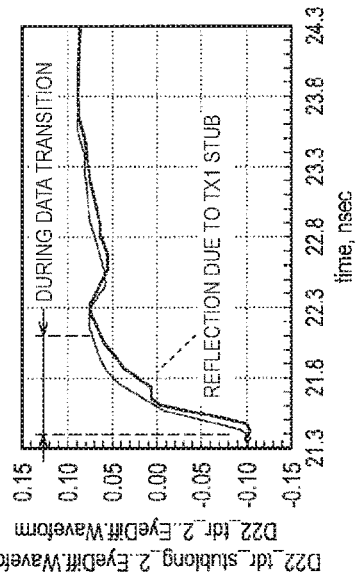
FIG. 7A
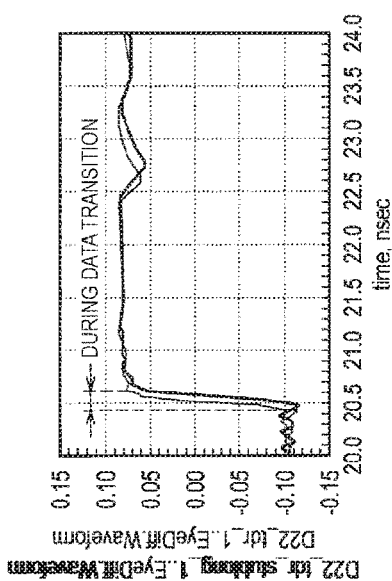
FIG. 7C
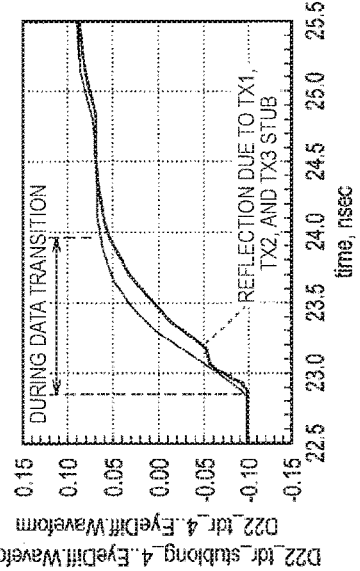
FIG. 7B
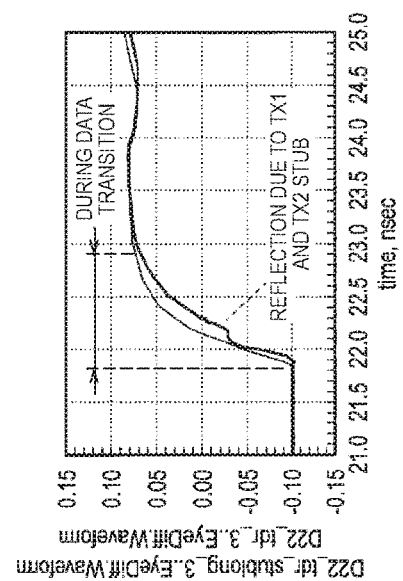
FIG. 7D
FIG. 7E $a_i$ : CHANNEL ISI COMPONENT (i=1,2,···)
$h_i$ : REFLECTION COMPONENT (i=1,2,···)

FIG. 14

|  | UISELx | | | OUT |
| --- | --- | --- | --- | --- |
|  | 0 | 0 | 0 |  |
| 0 UI SHIFT | 0 | 0 | 0 | D[n] |
| 1 UI SHIFT | 0 | 0 | 1 | INV(D[n−1]) |
| 2 UI SHIFT | 0 | 1 | 0 | INV(D[n−2]) |
| 3 UI SHIFT | 0 | 1 | 1 | INV(D[n−3]) |
| 4 UI SHIFT | 1 | 0 | 0 | INV(D[n−4]) |
| 5 UI SHIFT | 1 | 0 | 1 | INV(D[n−5]) |
| 6 UI SHIFT | 1 | 1 | 0 | INV(D[n−6]) |
| 7 UI SHIFT | 1 | 1 | 1 | INV(D[n−7]) |

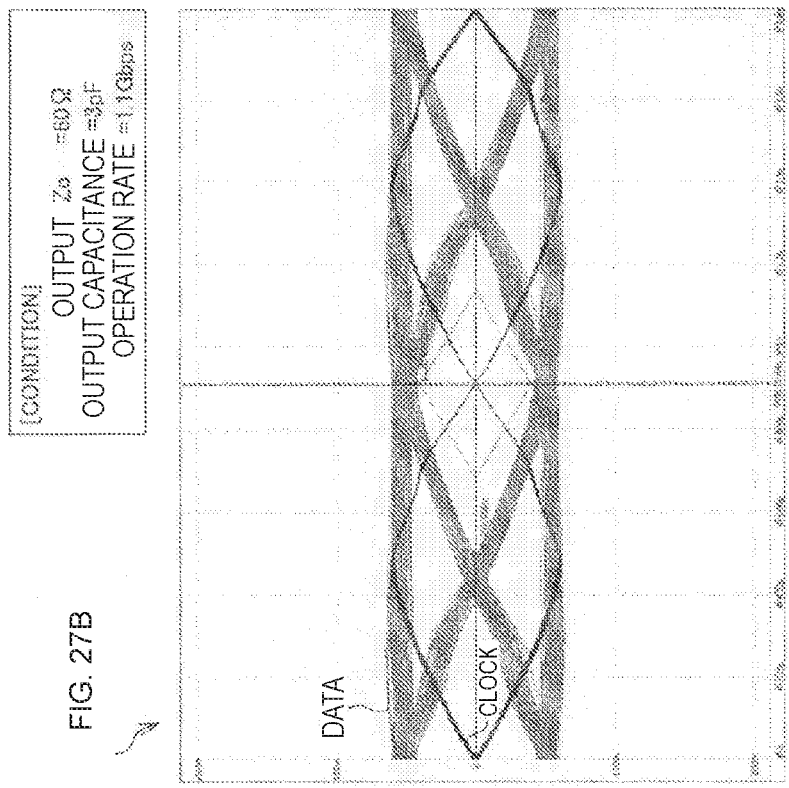
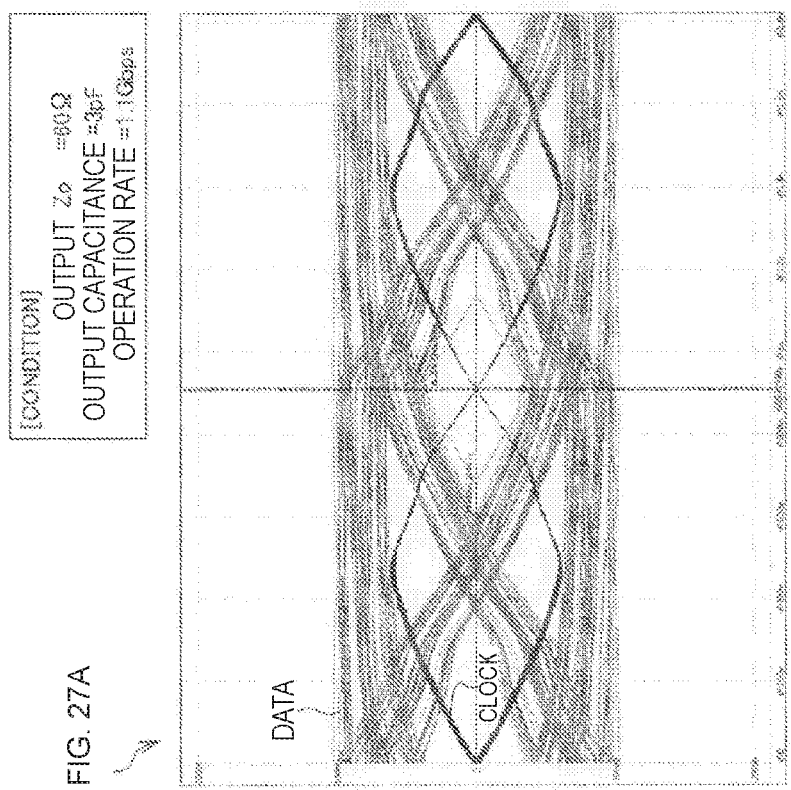

TRANSMISSION DEVICE AND SYSTEM

CROSS REFERENCE TO RELATED APPLICATIONS

This application is a U.S. National Phase of International Patent Application No. PCT/JP2017/025311 filed on Jul. 11, 2017, which claims priority benefit of Japanese Patent Application No. JP 2016-180259 filed in the Japan Patent Office on Sep. 15, 2016. Each of the above-referenced applications is hereby incorporated herein by reference in its entirety.

TECHNICAL FIELD

The present disclosure relates to a transmission device and a system.

BACKGROUND ART

Technologies related to connection between devices, such as connection between a processor and a sensor, for example, have been developed. The technology described in Patent Literature 1 listed below, for example, is exemplified as one of the technologies related to connection between devices.

CITATION LIST

Patent Literature

Patent Literature 1: U.S. Patent Application Publication No. 2014/0281753

SUMMARY OF INVENTION

Technical Problem

For example, as the function of electronic devices have become better and more numerous, some electronic devices that include processing devices such as processors now include a plurality of sensors such as a plurality of image sensors. Also, it is desirable to reduce the numbers of signal input terminals in processing devices and the numbers of transmission lines connected to the processing devices in electronic devices provided with the processing devices as described above. In this manner, it is possible to realize the following effects, for example.
To reduce chip cost of the processing devices
To further simplify hardware configurations of the processing devices
To further reduce wiring regions that connect the processing devices to the plurality of sensors Here, standards for connecting a processor (an example of a processing devices; the same applies below) to an image sensor with a transmission line (interconnection) include a camera serial interface 2 (CSI-2) standard of the Mobile Industry Processor Interface (MIPI) Alliance. The CSI-2 standard is a standard of connecting a processor to an image sensor with a transmission line in a one-to-one fashion. According to existing standards such as the CSI-2 standard, "connection between a processor and a plurality of image sensors on a transmission line" is not assumed. Therefore, the number of necessary data signals connected to the processor is the number of image sensors in a case in which the processor and the plurality of respective image sensors are connected with the transmission line simply using an existing standard such as the CSI-2 standard. Accordingly, it is difficult to realize further reduction of the aforementioned wiring region, reduction of the number of input signals on the side of the processor, and reduction of the number of transmission lines connected to the aforementioned processor in the case in which an existing standard such as the CSI-2 standard is utilized.

Meanwhile, in a case of applying a transmission line to which a plurality of transmission devices is connected (hereinafter, this configuration will be referred to as a "multipoint bus" in some cases) to an electronic device provided with a processing device as described above, it is possible to reduce the number of data signals connected to the processing device.

However, waveform quality may be degraded due to reflection noise, for example, in a case in which data transmission is performed simply using a multipoint bus. Therefore, it is difficult to secure signal integrity (digital signal quality or transmission signal quality) even if only the multipoint bus is used.

The present disclosure proposes a novel and improved transmission device and system capable of improving signal quality in a case in which transmission data is transmitted via a transmission line to which a plurality of transmission devices is connected.

Solution to Problem

According to the present disclosure, there is provided a transmission device including: a transmission unit that has a function of transmitting a transmission signal with a reduced influence of reflection noise in transmission data after data transition on the basis of the transmission data.

In addition, according to the present disclosure, there is provided a transmission device including: a transmission unit that has a function of transmitting a transmission signal with a reduced influence of reflection noise in transmission data during data transition on the basis of the transmission data.

In addition, according to the present disclosure, there is provided a system including: a plurality of transmission devices that are each connected to a transmission line; and a reception device that is connected to the transmission line and receives data transmitted from each of the transmission devices. Each of the transmission devices includes a transmission unit that has a function of transmitting, via the transmission line, a transmission signal with a reduced influence of reflection noise in transmission data after data transition on the basis of the transmission data.

Advantageous Effects of Invention

According to the present disclosure, it is possible to improve signal quality in a case in which transmission data is transmitted via a transmission line to which a plurality of transmission devices is connected.

Note that the effects described above are not necessarily limitative. With or in the place of the above effects, there may be achieved any one of the effects described in this specification or other effects that may be grasped from this specification.

BRIEF DESCRIPTION OF DRAWINGS

FIGS. 1A and 1B are explanatory diagrams illustrating a configuration of a system according to an embodiment.

FIGS. 4A, 4B, 4C, 4D, and 4E are explanatory diagrams for describing a first example of degradation of waveform quality that may be caused in a system in which an existing multipoint bus is used.

FIG. 5 is an explanatory diagram for describing the first example of degradation of waveform quality that may be caused in the system in which the existing multipoint bus is used.

FIGS. 6A, 6B, 6C, 6D, and 6E are explanatory diagrams for describing a second example of degradation of waveform quality that may be caused in the system in which the existing multipoint bus is used.

FIGS. 7A, 7B, 7C, 7D, and 7E are explanatory diagrams for describing the second example of degradation of waveform quality that may be caused in the system in which the existing multipoint bus is used.

FIG. 14 is an explanatory diagram for describing processing performed by the adjustment data generation unit provided in the transmission device according to the first embodiment.

FIGS. 27A and 27B are explanatory diagrams illustrating an example of advantages achieved by the transmission device according to the third embodiment.

DESCRIPTION OF EMBODIMENTS

Figure 2A:
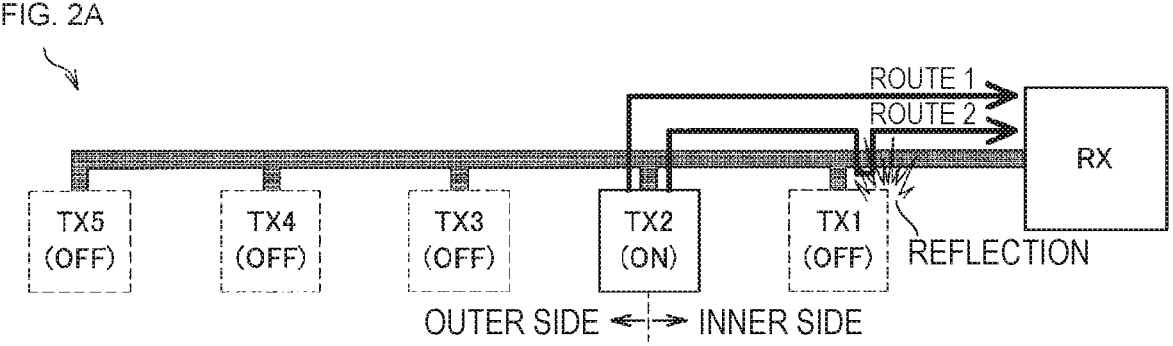
FIGS. 2A and 2B are explanatory diagrams for describing degradation of waveform quality due to reflection caused by a stub in a case in which a multipoint bus is used.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Also, hereinafter, description will be given in the order described below.
1. System according to embodiment
2. Transmission device according to embodiment
3. Program according to embodiment Also, hereinafter, a transmission device will be referred to as "TXn" (n is a number that is applied to distinguish the transmission device) and a reception device will be referred to as "RX" in some cases.

System According to Embodiment

FIGS. 1A and 1B are explanatory diagrams illustrating an example of a configuration of a system 1000 according to an embodiment. FIG. 1A illustrates an example of a transmission path model of the system 1000. In addition, FIG. 1B simply illustrates the system 1000 illustrated in FIG. 1A.

Examples of the system 1000 include mobile bodies such as a drone (a device capable of being operated through remote operations or performing autonomous operation; the same applies below), a vehicle, and the like. Note that application examples of the system 1000 are not limited to the examples described above. Other application examples of the system 1000 will be described later.

The system 1000 has five transmission devices (TX1, TX2, TX3, TX4, and TX5) and one reception device (RX), for example. Each of the transmission devices and the reception device are driven by electrical power supplied from an internal power source (not illustrated) that forms the system 1000, such as a battery, or electrical power supplied from an external power source of the system 1000.

Note that, although FIGS. 1A and 1B illustrate the system 1000 that has the five transmission devices, the number of transmission devices that the system according to the embodiment has is not limited to that in the example illustrated in FIGS. 1A and 1B. For example, the system according to the embodiment may have two or more or an arbitrary number of transmission devices, such as two to four transmission devices or four or more transmission devices.

Each of the plurality of transmission devices and the reception device are electrically connected with one transmission line B as illustrated in FIG. 1B. The transmission line B is a transmission path for one signal that connects each of the transmission devices and the reception device. For example, data transmitted from each of the transmission devices is delivered from each of the transmission devices to the reception device via the transmission line B. That is, it can be said that the transmission line B is a multipoint bus that connects each of the five transmission devices to the reception device.

[1] Concerning Degradation of Waveform Quality that May be Caused in System in which Existing Multipoint Bus is Used Before describing a method for improving signal quality in the system 1000, degradation of waveform quality that may be caused in a system in which an existing multipoint bus is used will be described. Hereinafter, it is assumed that the system in which the existing multipoint bus is used has a configuration that is similar to that of the system 1000 illustrated in FIG. 1B for convenience of description. Also, hereinafter, the system in which the existing multipoint bus is used will temporarily be referred to as an "existing system" for convenience of description. Note that the expression "existing system" does not indicate a "system in which the existing multipoint bus exemplified below is actually present."

In a case in which the multipoint bus is used, each of the transmission devices transmits data at a different timing in order to avoid collision of the data output from each of the plurality of transmission devices. Hereinafter, a state in which the transmission devices are transmitting data will be referred to as an "ON state" or will simply be referred to as "ON" and a state in which the transmission devices are not transmitting data will be referred to as an "OFF state" or will simply be referred to as "OFF."

In addition, in the case in which the multipoint bus is used, a pass to a transmission device in the OFF state in the transmission line can be regarded as a stub (wiring branched from main wiring).

Therefore, in the case in which the multipoint bus is used, there is a concern that waveform quality of data transmitted from a transmission device in the ON state may be degraded due to reflection caused by a stub corresponding to the transmission device in the OFF state.

FIGS. 2A 2B, 3A, and 3B are explanatory diagrams for describing degradation of waveform quality due to reflection caused by a stub in the case in which the multipoint bus is used. FIGS. 2A 2B, 3A, and 3B illustrate an example in which the transmission device represented as TX2 is in the ON state while the other transmission devices are in the OFF state among the transmission devices that form the existing system. Hereinafter, the side of the reception device when seen from the transmission device in the ON state will be referred to as an "inner side" while the side opposite to the inner side when seen from the transmission device in the ON state will be referred to as an "outer side" as illustrated in FIGS. 2A 2B, 3A, and 3B, for example First, degradation of waveform quality due to reflection caused by a stub that is present on the inner side when seen from the transmission device in the ON state will be described with reference to FIGS. 2A and 2B.

In a case in which data is transmitted from the transmission device represented as TX2, the data transmitted from the transmission device is delivered to the reception device via a route in which no reflection due to a stub has occurred (represented as a route 1 in FIG. 2A) and a route in which reflection due to a stub that is present on the inner side has occurred (represented as a route 2 in FIG. 2A), for example, as illustrated in FIG. 2A.

Figure 2B:
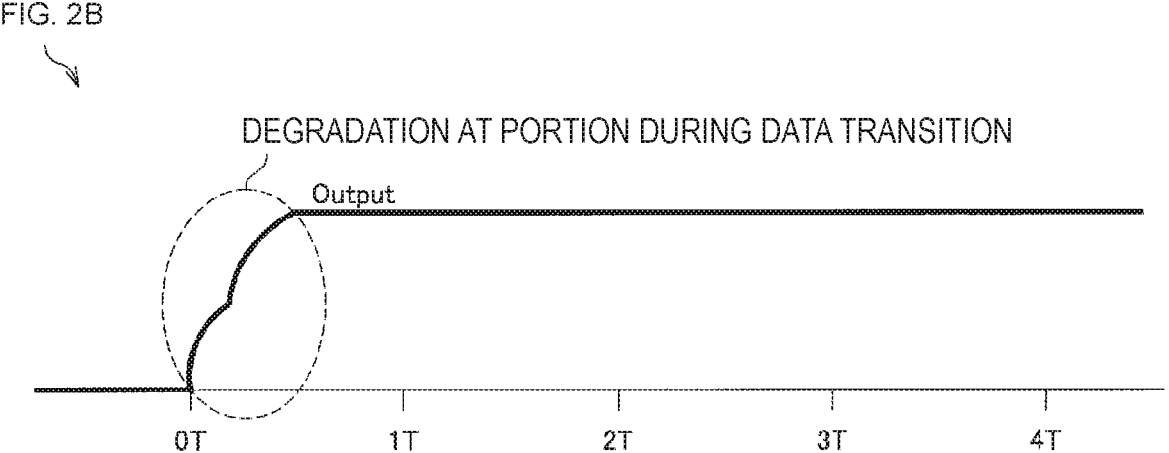

Here, the data transmitted via the route 2 illustrated in FIG. 2A becomes reflection noise. Since a signal route difference between the route 1 and the route 2 is small, the reflection caused by a stub that is present on the inner side may be a factor of degradation of a waveform during data transition. Therefore, the waveform of the data received by the reception device has degraded waveform quality at a portion during the data transition as illustrated in FIG. 2B due to the reflection noise caused by the reflection due to the stub that is present on the inner side.

Next, degradation of waveform quality due to reflection caused by a stub that is present on the outer side when seen from the transmission device in the ON state will be described with reference to FIGS. 3A and 3B.

Figure 3A:
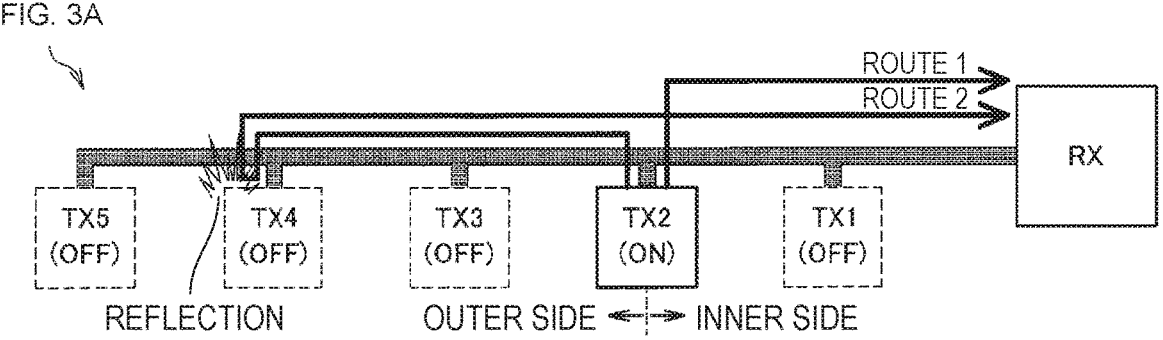
FIGS. 3A and 3B are explanatory diagrams for describing degradation of waveform quality due to reflection caused by a stub in a case in which the multipoint bus is used.
Figure 3B:
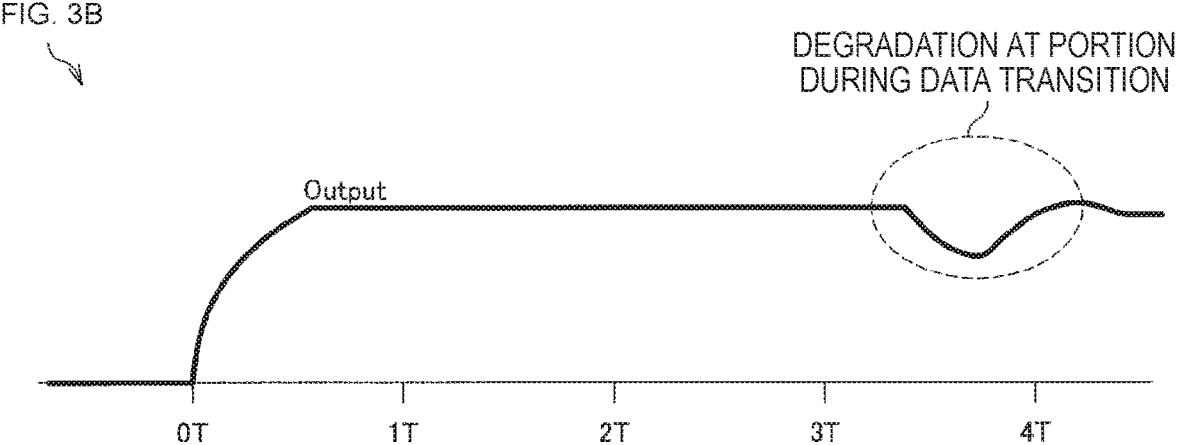

In a case in which data is transmitted from the transmission device represented as TX2, the data transmitted from the transmission device is delivered to the reception device via a route in which no reflection due to a stub has occurred (represented as the route 1 in FIG. 3A) and a route in which reflection due to a stub that is present on the outer side has occurred (represented as the route 2 in one example in FIG. 3A), for example, as illustrated in FIG. 3A.

Here, the data delivered via the route 2 illustrated in FIG. 3A becomes reflection noise. Since a signal route difference between the route 1 and the route 2 is large, the reflection due to the stub that is present on the outer side becomes a factor of degradation of the waveform after the data transition. Therefore, the waveform quality at a portion after the data transition of the waveform of the data received by the reception device is degraded as illustrated in FIG. 3B by the reflection noise due to the reflection caused by the stub that is present on the outer side.

FIGS. 4A, 4B, 4C, 4D, 4E, and 5 are explanatory diagrams for describing a first example of degradation of waveform quality caused in a system in which an existing multipoint bus is used.

FIGS. 4A, 4B, 4C, 4D, and 4E illustrate an example of results of simulating how data transmitted from each transmission device is received by the reception device in the existing system. Conditions of the simulation illustrated in FIGS. 4A, 4B, 4C, 4D, and 4E are as follows.

Output resistance: 60 [ohms]
Output capacitance: 3 [pF]
Data rate (operation rate): 1.1 [Gbps]
Stub series terminated logic (SSTL): Applied FIGS. 4A, 4B, 4C, 4D, and 4E illustrate simulation results in cases in which data is transmitted from the following transmission devices that form the existing system.

FIG. 4A: the transmission device represented as TX1
FIG. 4B: the transmission device represented as TX2
FIG. 4C: the transmission device represented as TX3
FIG. 4D: the transmission device represented as TX4
FIG. 4E: the transmission device represented as TX5

Also, FIG. 5 is a diagram illustrating influences of reflection due to a stub by exemplifying simulation results illustrated in FIG. 4B.

As illustrated in FIGS. 4A, 4B, 4C, 4D, and 4E, it is recognized that signal integrity has been degraded due to reflection caused by a stub. Referring to the simulation results illustrated in FIG. 4B as an example, the signal integrity has been degraded due to influences of reflection caused by a stub that is present on the inner side and influences of reflection caused by a stub that is present on the outer side as illustrated in FIG. 5.

FIGS. 6A, 6B, 6C, 6D, 6E, 7A, 7B, 7C, 7D, and 7E are explanatory diagrams for describing a second example of degradation of waveform quality caused in the system in which the existing multipoint bus is used.

FIGS. 6A, 6B, 6C, 6D, 6E, 7A, 7B, 7C, 7D, and 7E illustrate an example of step response properties obtained as a result of analyzing a waveform in relation to how data transmitted from each transmission device is received by the reception device in the existing device. FIGS. 6A, 6B, 6C, 6D, and 6E, are diagrams in which attention is paid to the step response properties after data transition while FIGS. 7A, 7B, 7C, 7D, and 7E, are diagrams in which attention is paid to the step response properties during the data transition.

FIGS. 6A, 6B, 6C, 6D, 6E, 7A, 7B, 7C, 7D, and 7E illustrate the step response properties in a case in which the stub length is set to "Short" or "Long" as described below (the same applies below).

Short: 0.8 to 2.0 [mm]
Long: 8.2 to 9.5 [mm]

FIGS. 6A, 6B, 6C, 6D, 6E, FIGS. 7A, 7B, 7C, 7D, and 7E respectively illustrate the step response properties in a case in which data has been transmitted from the following transmission devices that form the existing system.

FIG. 6A and FIG. 7A: step response properties of transmission device TX1
FIG. 6B and FIG. 7B: step response properties of transmission device TX2
FIG. 6C and FIG. 7C: step response properties of transmission device TX3
FIG. 6D and FIG. 7D: step response properties of transmission device TX4
FIG. 6E and FIG. 7E: step response properties of transmission device TX5

As illustrated in FIGS. 6A, 6B, 6C, 6D, and 6E, it is recognized that the signal integrity after the data transition has been degraded due to the reflection caused by the stub on the outer side. Also, as illustrated in FIGS. 7A, 7B, 7C, 7D, and 7E, it is recognized that the signal integrity during the data transition has been degraded due to the reflection caused by the stub on the inner side.

Figure 8:
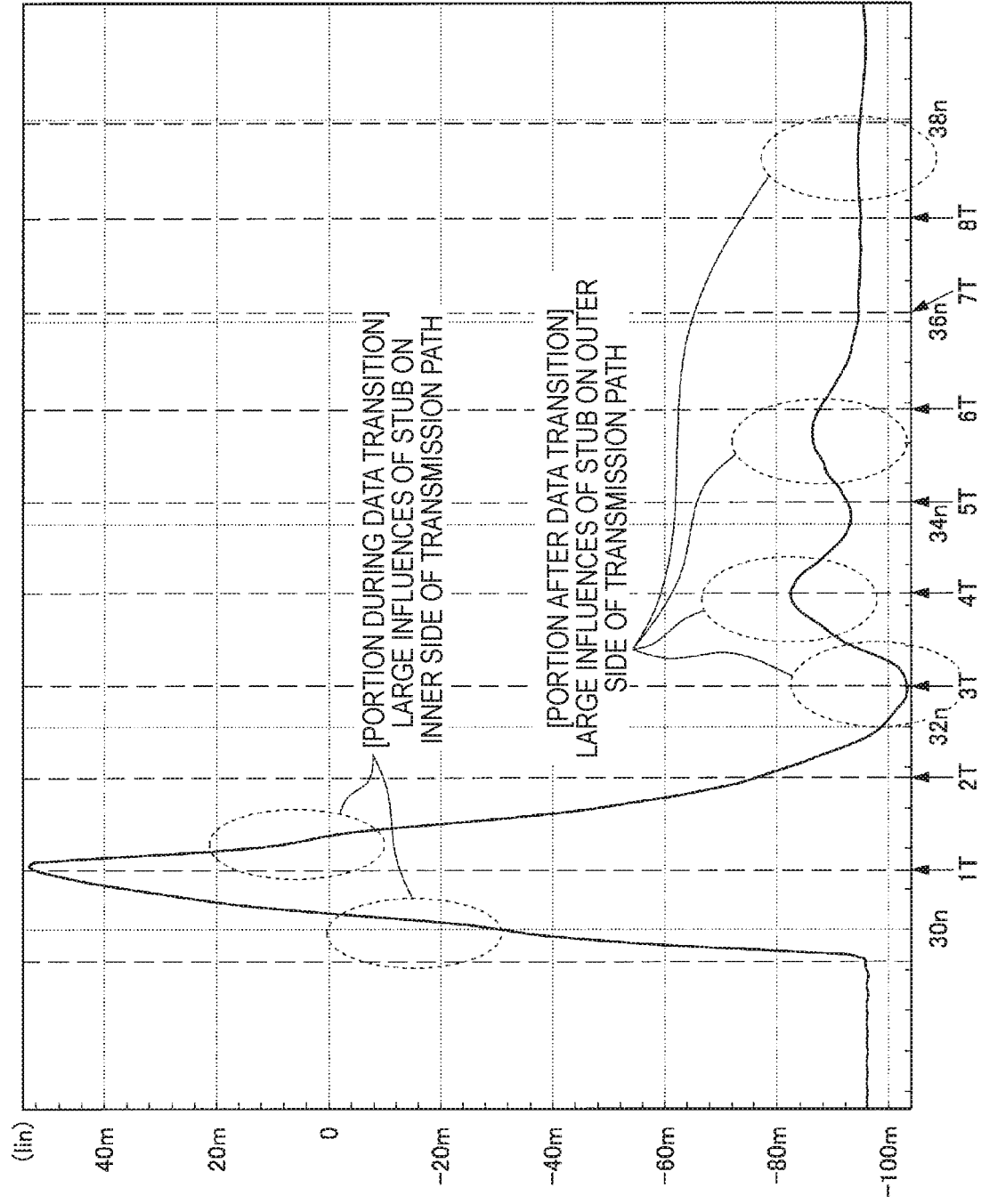
FIG. 8 is an explanatory diagram for describing a third example of degradation of waveform quality that may be caused in the system in which the existing multipoint bus is used.
Figure 9A:
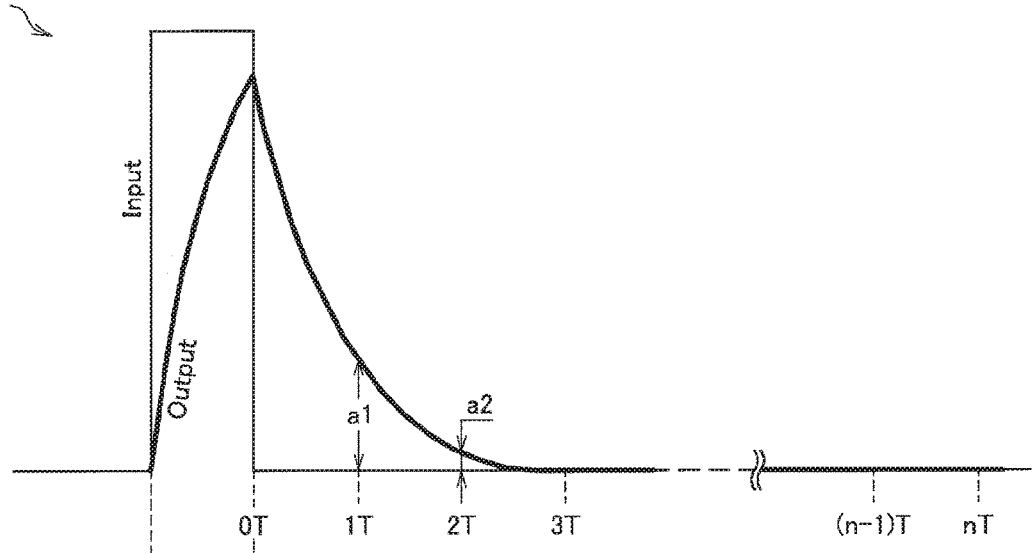
FIGS. 9A and 9B are explanatory diagrams for describing the third example of degradation of waveform quality that may be caused in the system in which the existing multipoint bus is used.
Figure 9B:
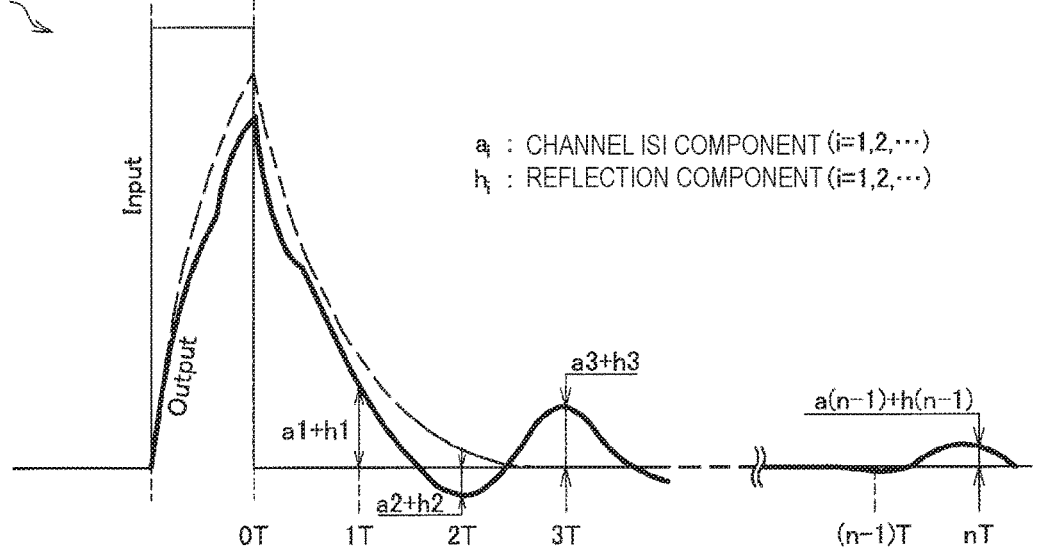

FIGS. 8 9A, and 9B are explanatory diagrams for describing a third example of degradation of waveform quality caused in the system in which the existing multipoint bus is used.

FIG. 8 illustrates an example of pulse response properties obtained as a result of analyzing a waveform in relation to how data transmitted from a certain transmission device is received by the reception device in the existing system.

Also, FIGS. 9A and 9B are diagrams for comparing "pulse response properties in a case in which the existing multipoint bus is used as a transmission path" with "pulse response properties in a case in which a transmission line with which the transmission device and the reception device are connected in a one-to-one fashion such as a transmission line related to the CSI-2 standard is used as a transmission path".

Hereinafter, the transmission path in which the multipoint bus is used will be referred to as a "multipoint bus transmission path" in some cases. Also, hereinafter, the transmission path in which the transmission line with which the transmission device and the reception device are connected in a one-to-one fashion will be referred to as a "point-to-point transmission path" in some cases.

FIG. 9A illustrates pulse response properties in the point-to-point transmission path. Also, FIG. 9B illustrates pulse response properties in a case in which the existing multipoint bus is used as a transmission path.

As illustrated in FIG. 8 and FIG. 9B, a channel ISI component (a) decreases in an exponential fashion, and a reflection component (h) is discretely present. That is, it is recognized that influences of reflection noise after the data transition discretely appears as illustrated in FIG. 8 and FIG. 9B.

As described above, one of or both the waveform quality at the portion during the data transition and the waveform quality at the portion after the data transition may be degraded depending on a positional relationship between the transmission device and the reception device in the ON state and the transmission device in the OFF state in the multipoint bus in the existing system.

Therefore, it is not possible to expect improvement in signal quality in the existing system.

Here, it is possible to exemplify utilization of the SSTL technology as one of methods by which it is possible to reduce influences of reflection caused by a stub. However, it is not possible to sufficiently reduce the influences of the reflection due to a stub even if the SSTL technology is used as illustrated in the simulation results in FIGS. 4A, 4B, 4C, 4D, and 4E.

Also, it is possible to exemplify application of an equalizer technology, such as a decision feedback equalizer (DFE), to the reception device as another method by which it is possible to reduce the influences of the reflection due to a stub. There is an advantage that it is possible to prevent reflection components from increasing by the DFE being used in the reception device. However, there are significant disadvantages that an increase in a data rate is prevented by a feedback delay, power consumption of the reception device increases, and complication in implementing the reception device increases, for example, in the case in which the DFE is used in the reception device.

In addition, it is possible to exemplify utilization of the double termination technology as a method by which it is possible to reduce the influences of the reflection at an end of the transmission path. However, it is not possible to suppress the influences of the reflection caused by a stub even if the double termination technology is used.

[2] Concerning Method for Improving Signal Quality in System 1000

Thus, improvement in signal quality is realized by the transmission device according to the embodiment that forms the system 1000 attempting one of or both prevention of the degradation of the waveform quality at the portion after the data transition and prevention of the waveform quality at the portion during the data transition in the system 1000.

[2-1] Concerning Method of Preventing Waveform Quality at Portion after Data Transition from Being Degraded in Transmission Device According to Embodiment The transmission device according to the embodiment transmits a transmission signal with reduced influences of reflection noise after data transition in transmission data (hereinafter, also referred to as a "first transmission signal" in some cases) on the basis of the transmission data.

Here, the transmission data according to the embodiment is data as a target of transmission that the transmission device according to the embodiment transmits to the reception device via the multipoint bus.

In addition, the first transmission signal according to the embodiment is a signal based on the transmission data as described above. More specifically, the first transmission signal is a signal obtained by subtracting the reflection noise after the data transition from the transmission data as will be described later.

As described above, degradation of the waveform quality at the portion after the data transition is caused by the reflection noise due to a stub that is mainly present on the outer side. Also, the influences of the reflection noise after the data transition discretely appear as described above.

Therefore, the transmission device according to the embodiment prevents the waveform quality at the portion after the data transition from being degraded by transmitting the signal obtained by subtracting the reflection noise after the data transition from the transmission data in advance.

Figure 10:
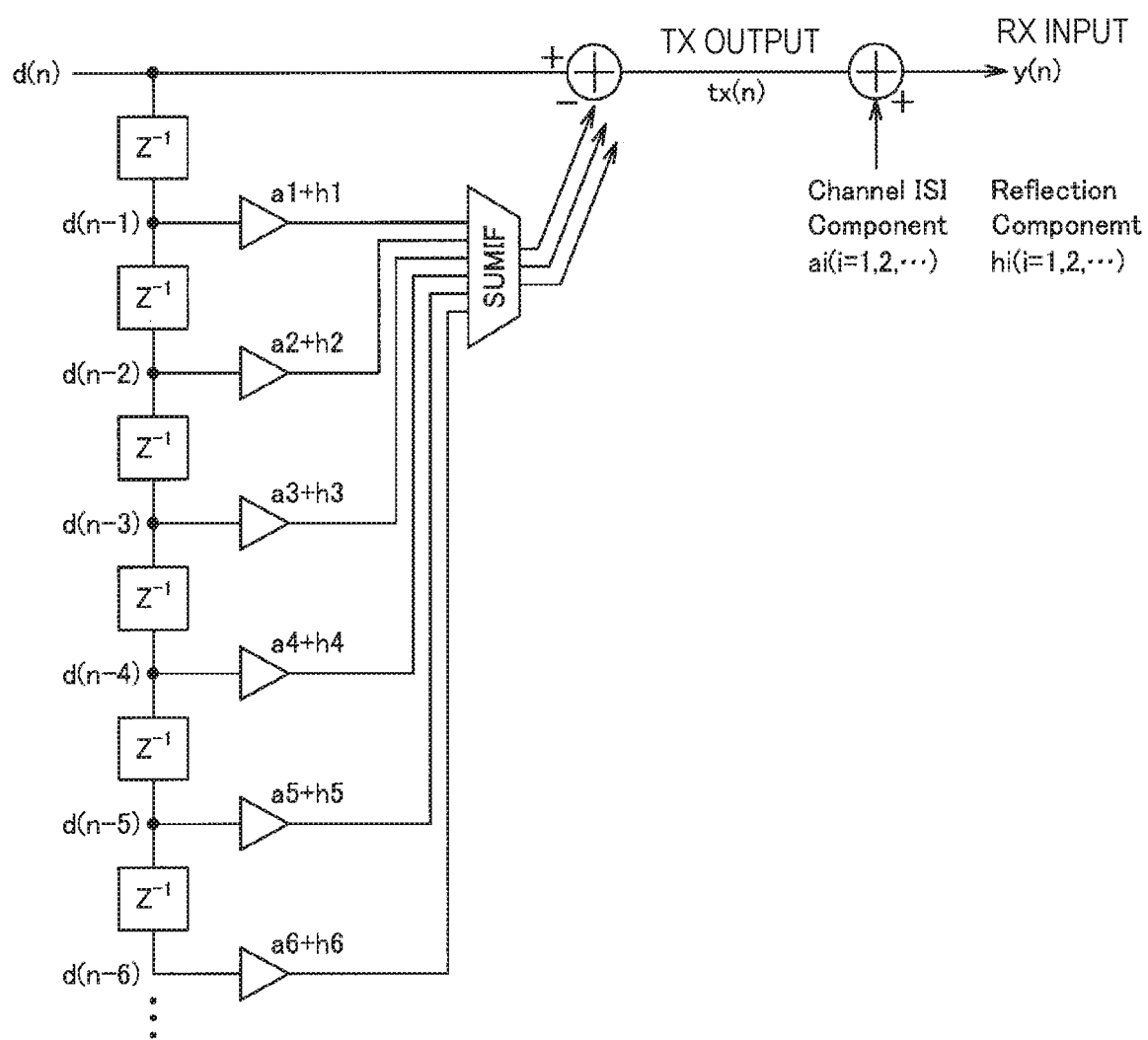
FIG. 10 is an explanatory diagram for describing a method of preventing waveform quality at a portion after data transition from being degraded in a transmission device according to an embodiment.

FIG. 10 is an explanatory diagram for describing the method of preventing the waveform quality at the portion after the data transition from being degraded in the transmission device according to the embodiment. "D(n)" illustrated in FIG. 10 represents the transmission data while "Tx(n)" illustrated in FIG. 10 represents the first transmission signal.

As illustrated in FIG. 10, the transmission device according to the embodiment generates a plurality of delay data pieces with different amounts of delay from the transmission data. Then, the transmission device according to the embodiment generates the first transmission signal obtained by subtracting the reflection noise after the data transition from the transmission data on the basis of the plurality of generated delay data pieces.

Note that although FIG. 10 illustrates an example in which condition addition of the plurality of delay data pieces are performed, the method of preventing the waveform quality at the portion after the data transition from being degraded can be realized without performing the condition addition.

An example of the configuration of the transmission device according to the embodiment capable of realizing the method of preventing the waveform quality at the portion after the data transition from being degraded will be described later.

[2-2] Concerning Method of Preventing Waveform Quality at Portion During Data Transition from being Degraded in Transmission Device According to Embodiment The transmission device according to the embodiment transmits a transmission signal with reduced influences of reflection noise during data transition in the transmission data (hereinafter, also referred to as a "second transmission signal" in some cases) on the basis of the transmission data.

The second transmission signal according to the embodiment is data based on the transmission data as described above. More specifically, the second transmission signal is a signal with a shaped output waveform such that the input waveform during the data transition in the signal received by the reception signal becomes more linear as will be described later.

As described above, the degradation of the waveform quality at the portion during the data transition is caused by reflection noise due to a stub that is mainly present on the inner side.

Therefore, the transmission device according to the embodiment prevents the waveform quality at the portion during the data transition from being degraded by subtracting the reflection noise during the data transition from the waveform of the signal corresponding to the transmission data and transiting the signal with the shaped waveform.

Figure 11A:
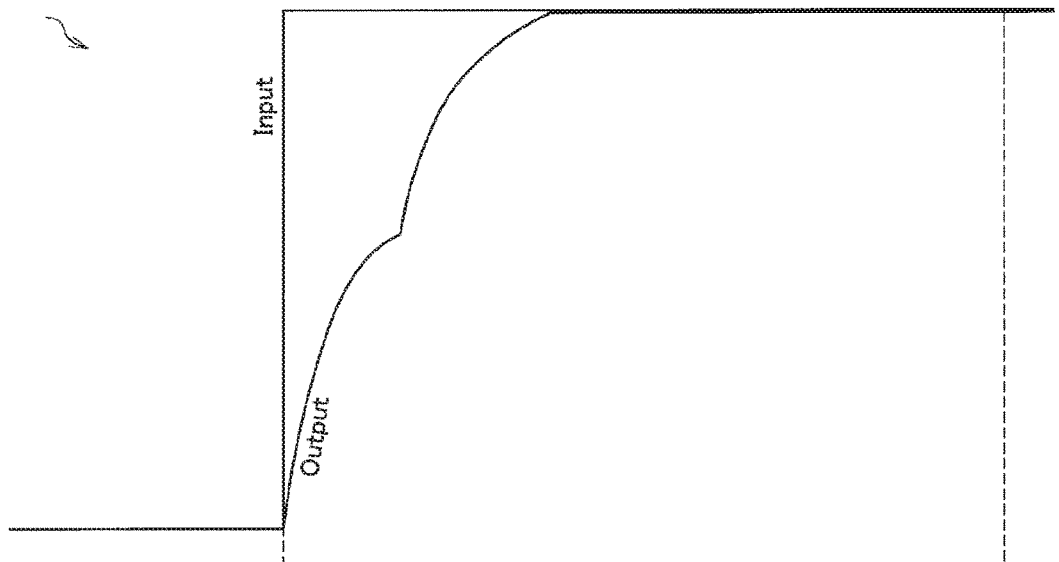
FIGS. 11A and 11B are explanatory diagrams for describing a method of preventing waveform quality at a portion during data transition from being degraded in the transmission device according to an embodiment.
Figure 11B:
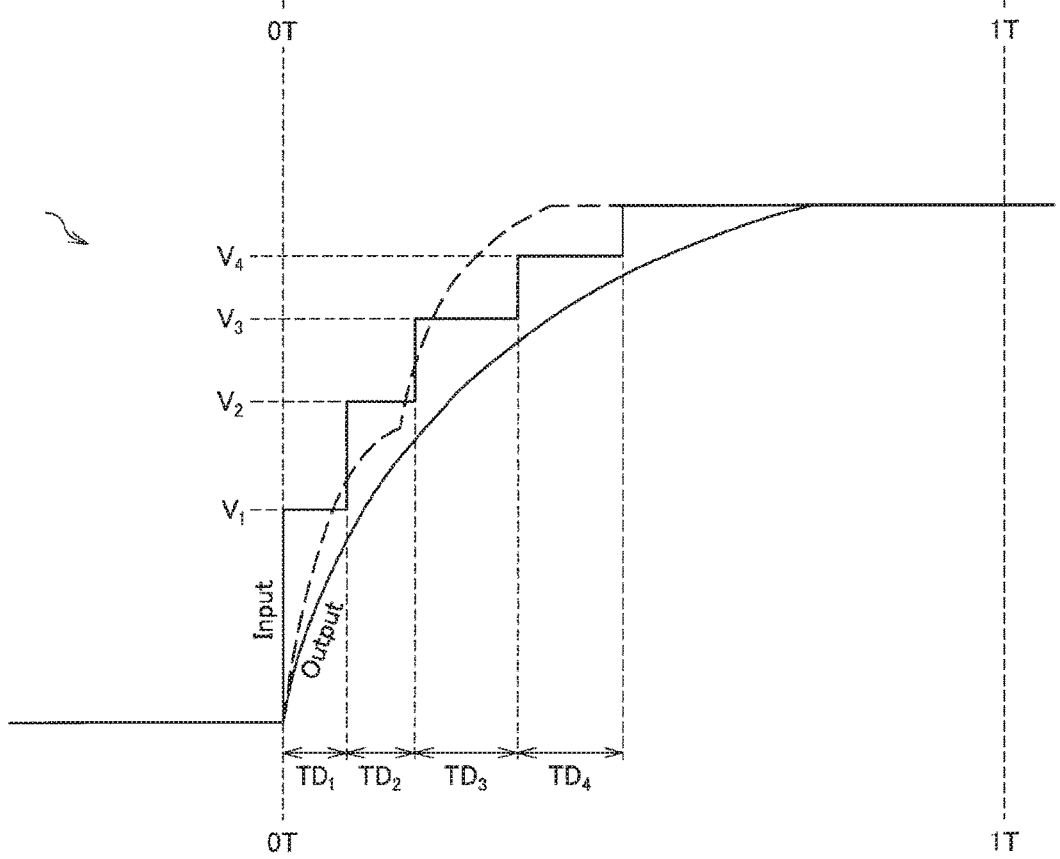

FIGS. 11A and 11B are explanatory diagrams for describing a method of preventing waveform quality at the portion during the data transition from being degraded in the transmission device according to the embodiment.

FIG. 11A illustrates an output waveform of the signal output from the transmission device in the existing system ("Input" illustrated in FIG. 11A) and an input waveform during the data transition in the signal received by the reception device ("Output" illustrated in FIG. 11A). Also, FIG. 11B illustrates an output waveform of the signal output from the transmission device ("Input" illustrated in FIG. 11B) and an input waveform during the data transition in the signal received by the reception device ("Output" illustrated in FIG. 11B) in a case in which the method of preventing the waveform quality at the portion during the data transition from being degraded is used.

As illustrated in FIG. 11B, the transmission device according to the embodiment shapes the output waveform such that the input waveform during the data transition in the signal received by the reception device becomes linear and transmits the transmission signal.

An example of the configuration of the transmission device according to the embodiment capable of realizing the method of preventing the waveform quality at the portion during the data transition from being degraded will be described later.

Transmission Device According to Embodiment

Next, a configuration of the transmission device according to the embodiment capable of realizing one of or both the method of preventing the waveform quality at the portion after the data transition from being degraded and the method of preventing the waveform quality at the portion during the data transition from being degraded as described above will be described.

[1] Transmission Device According to First Embodiment

First, a transmission device capable of realizing the method of preventing the waveform quality at the portion after the data transition from being degraded will be described as a transmission device according to a first embodiment.

Figure 12:
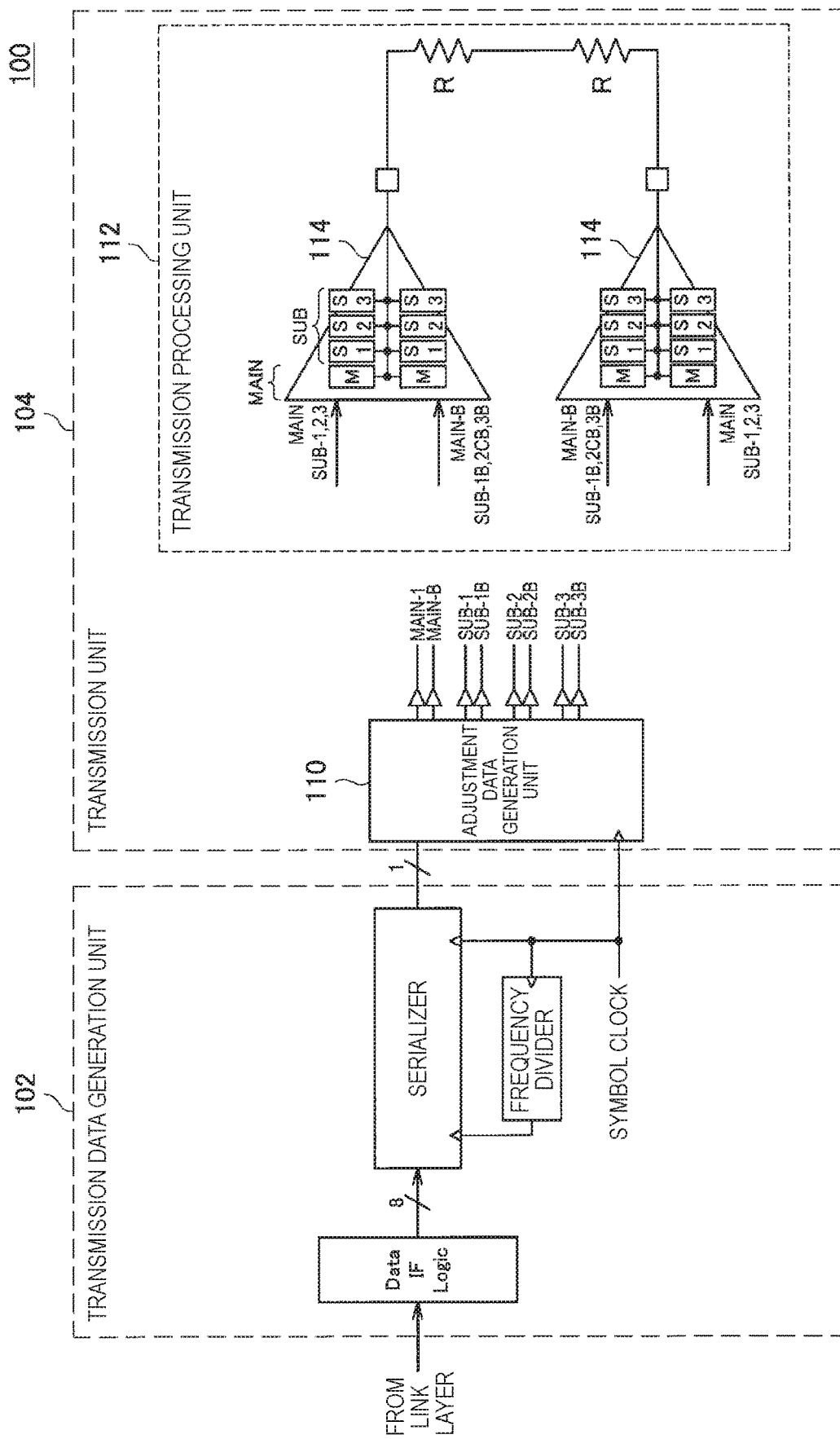
FIG. 12 is a block diagram illustrating an example of a configuration of a transmission device according to a first embodiment.

FIG. 12 is a block diagram illustrating an example of a configuration of a transmission device 100 according to the first embodiment. The transmission device 100 includes a transmission data generation unit 102 and a transmission unit 104.

In addition, the transmission device 100 may include a device in accordance with the application example of the transmission device according to the embodiment, which will be described later, such as a sensor device, for example. Here, examples of the sensor device according to the embodiment includes an imaging device such as a digital still camera, a digital video camera, or a stereo camera, an infrared sensor, a distance image sensor, and the like. In a case in which the sensor device as described above is included, the transmission device 100 functions as an image sensor.

Hereinafter, a case in which the transmission device 100 functions as an image sensor and transmits image data as transmission data will be exemplified.

The transmission data generation unit 102 has a data interface logic circuit that receives a data signal from an upper layer (such as a link layer), a serializer, and a frequency divider, for example, and generates transmission data. The transmission data generation unit 102 generates the transmission data by converting an analog signal generated by the sensor device into serial data, for example.

Note that the configuration of the transmission data generation unit 102 is not limited to that in the example illustrated in FIG. 12 and an arbitrary configuration capable of generating transmission data can be employed.

In addition, the transmission device 100 may not additionally include the transmission data generation unit 102 in a case in which the sensor device has a function of outputting image data, for example. Also, the transmission device 100 may not include the transmission data generation unit 102 in a case in which data generated by an external device is transmitted as transmission data, such as a case in which the transmission device 100 is connected to an external sensor device that has a function of outputting image data.

The transmission unit 104 plays a role of performing processing related to the method of preventing the waveform quality at the portion after the data transition from being degraded and has a function of transmitting the first transmission signal (the transmission signal with reduced influences of reflection noise after the data transition in the transmission data) on the basis of the transmission data. The transmission unit 104 transmits the first transmission signal via a multipoint bus.

The transmission unit 104 is formed with "one processor or two or more processors formed with arithmetic circuits such as micro processing units (MPUs)", "a dedicated circuit to realize the processing related to the method of preventing waveform quality at the portion after the data transition from being degraded", or the like, for example.

The transmission unit 104 includes an adjustment data generation unit 110 and a transmission processing unit 112, for example.

The adjustment data generation unit 110 generates adjustment data that reduces the reflection noise after the data transition on the basis of the transmission data. The adjustment data is used by the transmission processing unit 112 as will be described later.

The adjustment data generation unit 110 generates a plurality of delay data pieces with different amounts of delay from the transmission data. Then, the adjustment data generation unit 110 generates the adjustment data on the basis of the transmission data and the plurality of generated delay data pieces.

Figure 13:
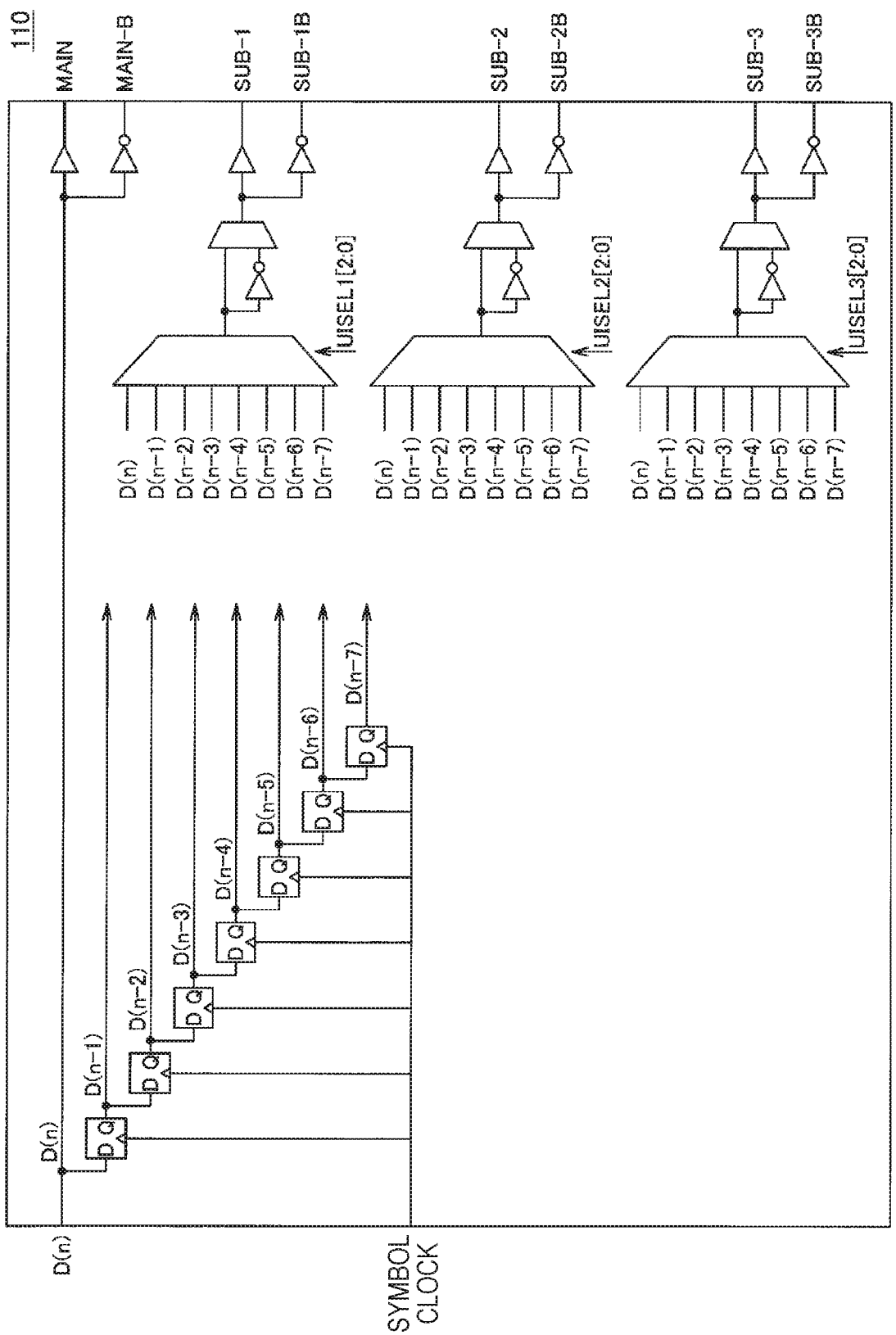
FIG. 13 is an explanatory diagram illustrating an example of a configuration of an adjustment data generation unit provided in the transmission device according to the first embodiment.

FIG. 13 is an explanatory diagram illustrating an example of a configuration of the adjustment data generation unit 110 provided in the transmission device 100 according to the first embodiment. "D(n)" illustrated in FIG. 13 represents transmission data. Also, "D(n-1)", "D(n-2)", "D(n-3)", "D(n-4)", "D(n-5)", "D(-6)", and "D(n-7)" illustrated in FIG. 13 respectively represent delay data pieces with different amounts of delay. In addition, "MAIN" illustrated in FIG. 13 represents transmission data while "MAIN-B" illustrated in FIG. 13 represents data obtained by bit-inverting the transmission data. In addition, "SUB-1", "SUB-1B", "SUB-2", "SUB-2B", "SUB-3", and "SUB-3B" illustrated in FIG. 13 represent adjustment data as illustrated in FIG. 13. "SUB-1B", "SUB-2B", and "SUB-3B" illustrated in FIG. 13 are data obtained by bit-inverting "SUB-1", "SUB-2", and "SUB-3", respectively.

The adjustment data generation unit 110 generates a plurality of delay data pieces with different amounts of delay from the transmission data using a plurality of clock delay circuits using a symbol clock as illustrated in FIG. 13, for example. Here, the symbol clock is generated using a phase locked loop (PLL) circuit (not illustrated), for example.

In addition, the adjustment data generation unit 110 performs condition addition on the plurality of delay data pieces and generates adjustment data by using results of the condition addition as illustrated in FIG. 13, for example. Note that the method of preventing the waveform quality at the portion after the data transition from being degraded can be realized without performing the condition addition as described above.

FIG. 14 is an explanatory diagram for describing processing of the adjustment data generation unit 110 provided in the transmission device 100 according to the first embodiment and illustrates an example of conditions for performing the condition addition.

The adjustment data generation unit 110 performs the condition addition with reference to a table in which conditions illustrated in FIG. 14, for example, are recorded. Note that it is needless to say that the condition addition performed by the adjustment data generation unit 110 is not limited to being performed on the basis of the conditions illustrated in FIG. 14.

The adjustment data generation unit 110 generates adjustment data by having the configuration illustrated in FIG. 13, for example. Note that it is needless to say that the configuration of the adjustment data generation unit 110 is not limited to that in the example illustrated in FIG. 13.

Referring again to FIG. 12, an example of the configuration of the transmission unit 104 will be described. The transmission processing unit 112 transmits the first transmission signal on the basis of the transmission data and the adjustment data.

The transmission processing unit 112 subtracts components that are observed as reflection noise after data transition from the transmission data on the basis of the adjustment data and transmits the first transmission signal. In the transmission processing unit 112, subtraction of the reflection noise after the data transition based on the adjustment data is performed by the driver circuit 114.

Figure 15:
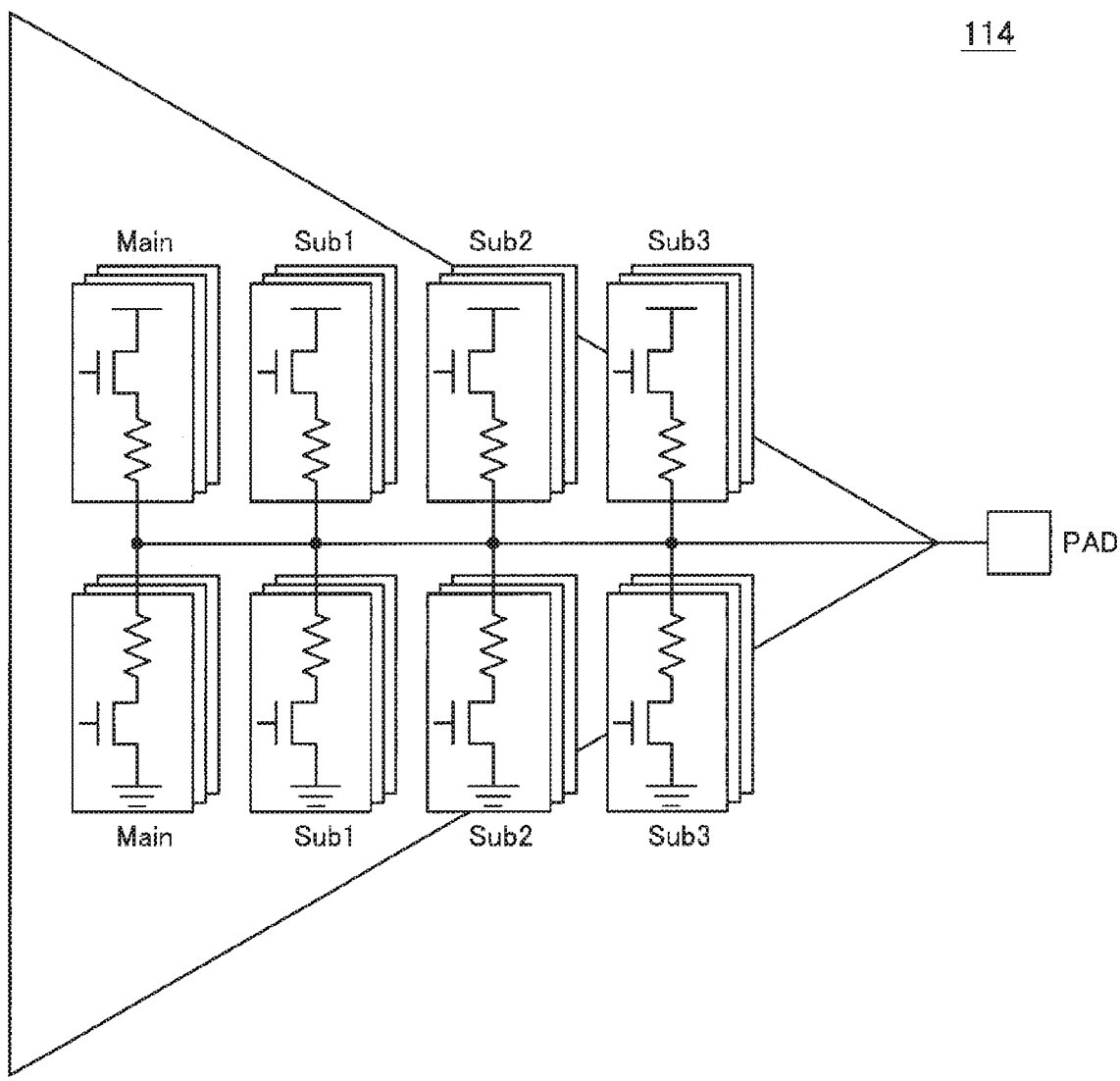
FIG. 15 is an explanatory diagram illustrating an example of a configuration of a driver circuit provided in the transmission device according to the first embodiment.

FIG. 15 is an explanatory diagram illustrating an example of a configuration of the driver circuit 114 provided in the transmission device 100 according to the first embodiment.

The driver circuit 114 includes four groups of driver circuits in "Main", "Sub1", "Sub2", and "Sub3", for example. Also, the driver circuit in each group has a differential pair and performs addition and subtraction on the signal by changing "a ratio between the number of stages on the upward side (the upper side in FIG. 15, for example) and the number of stages on the downward side (the lower side in FIG. 15, for example)" (hereinafter, also referred to as "a proportion between the numbers of stage" in some cases). Examples of an impedance relationship between the four groups of driver circuits include "'Main'<'Sub'//'Sub2'//'Sub3'". Hereinafter, the driver circuit represented as "Main", the driver circuit represented as "Sub1", the driver circuit represented as "Sub2", and the driver circuit represented as "Sub3" will be described as "M", "S1", "S2", and "S3", respectively.

Each driver circuit operates with data described below.

Driver circuit represented as "Main": transmission data represented as "MAIN" in FIG. 13 or data obtained by bit-inverting the transmission data represented in "MAIN-B" in FIG. 13

Driver circuit represented as "Sub1": adjustment data represented as "SUB-1" in FIG. 13 or adjustment data represented as "SUB-1B" in FIG. 13

Driver circuit represented as "Sub2": adjustment data represented as "SUB-2" in FIG. 13 or adjustment data represented as "SUB-2B" in FIG. 13

Driver circuit represented as "Sub3": adjustment data represented as "SUB-3" in FIG. 13 or adjustment data represented as "SUB-3B" in FIG. 13

Here, an example of operations of the transmission processing unit 112 will be described with exemplifying operations during a step response.

Figure 16:
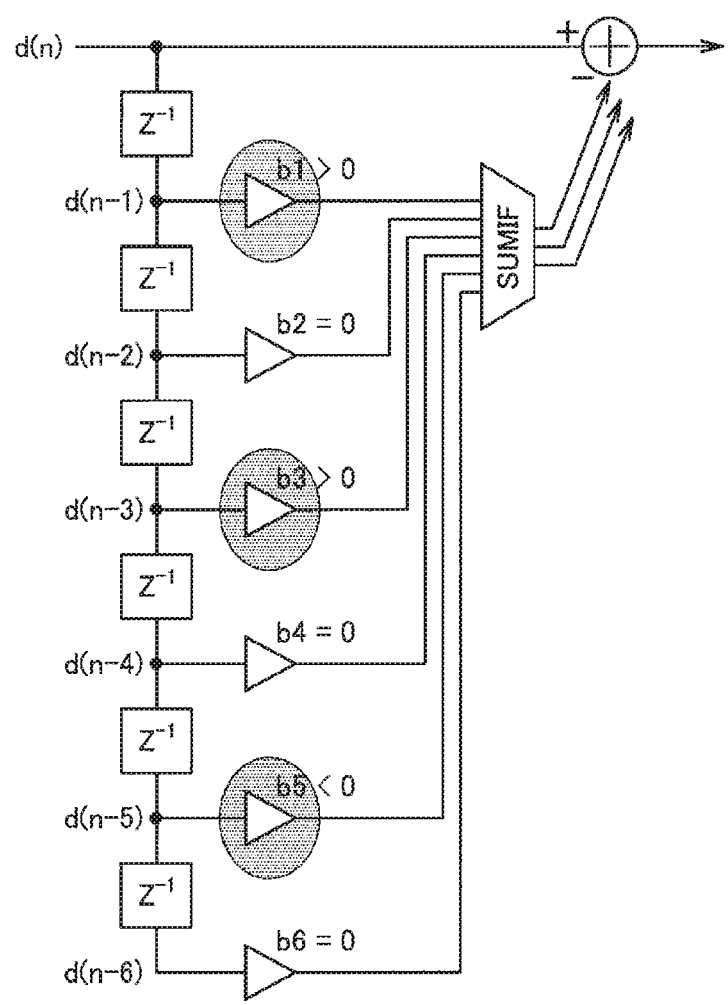
FIG. 16 is an explanatory diagram for describing an example of operations of a transmission processing unit provided in the transmission device according to the first embodiment.
Figure 17:
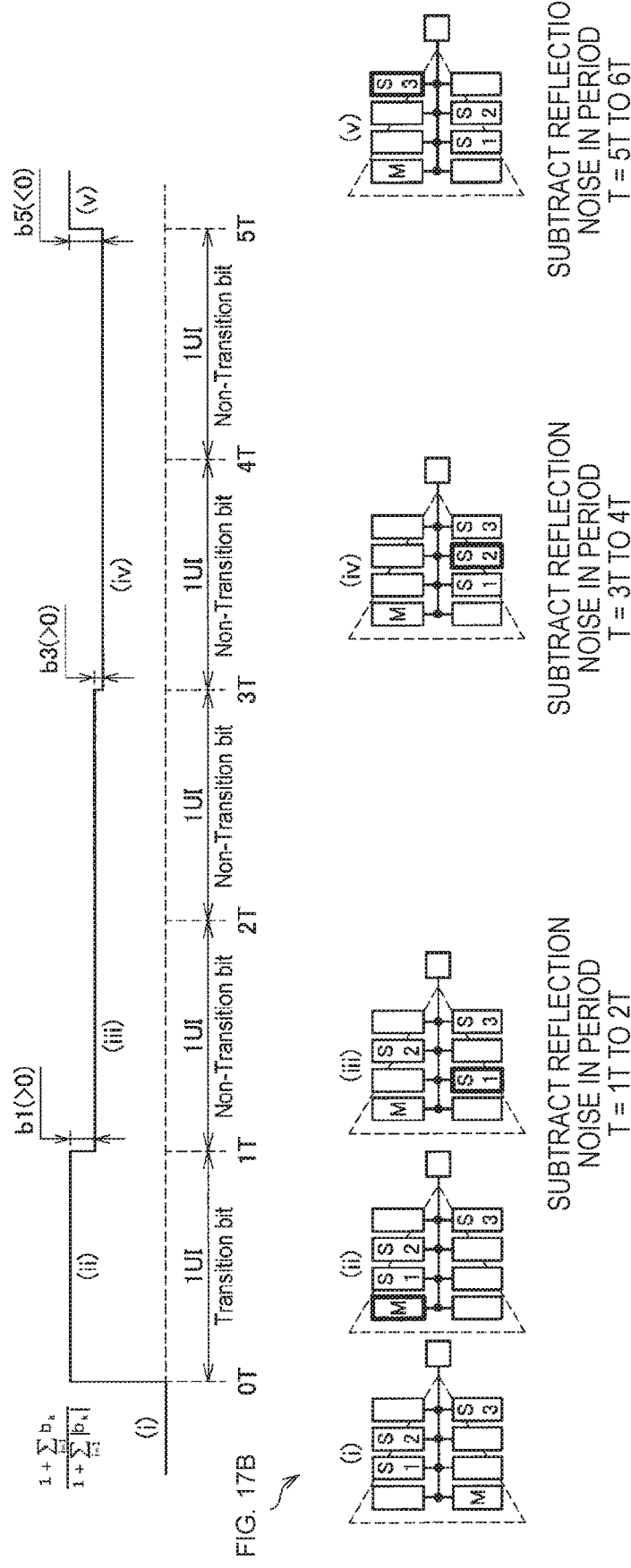
FIGS. 17A and 17B are explanatory diagrams for describing an example of operations of the transmission processing unit provided in the transmission device according to the first embodiment.

FIGS. 16, 17A, and 17B are explanatory diagrams for describing an example of operations of the transmission processing unit 112 provided in the transmission device 100 according to the first embodiment.

FIG. 16 illustrates processing of the transmission device 100 (processing related to the method of preventing the waveform quality at the portion after the data transition from being degraded) and is a diagram similar to FIG. 10.

In addition, FIGS. 17A and 17B illustrate operations of the transmission processing unit 112 during the step response in the case illustrated in FIG. 16, that is, in the case in which b1>0, b2=0, b3>0, b4=0, and b5>0. FIG. 17A illustrates the first transmission signal in the respective periods (i) to (v). Also, FIG. 17B illustrates operations of the driver circuit 114 in the respective periods (i) to (v).

In the period (period from 1T to 2T) represented in (iii) in FIGS. 17A and 17B, for example, reflection noise in this period due to a stub that is mainly present on the outer side is subtracted by the driver circuit represented as "Sub1". In addition, in the period (period from 3T to 4T) represented in (iv) in FIGS. 17A and 17B, for example, reflection noise in this period due to a stub that is mainly present on the outer side is subtracted by the driver circuit represented as "Sub2". Also, in the period (period from 5T to 6T) represented in (v) in FIGS. 17A and 17B, for example, reflection noise in this period due to a stub that is mainly present on the outer side is subtracted by the driver circuit represented as "Sub3". The subtraction of the noise in each period is adjusted by the ratio of the number of stages of the driver circuits in each group in "Sub1", "Sub2", and "Sub3" being changed, for example.

The transmission device 100 can transmit the first transmission signal obtained by subtracting the reflection noise after the data transition from the transmission data in advance by the transmission processing unit 112 operating as described in FIGS. 17A and 17B, for example. Note that it is needless to say that the operations of the transmission processing unit 112 are not limited to those in the example illustrated in FIGS. 17A and 17B.

The transmission processing unit 112 transmits the first transmission signal by having the configuration illustrated in FIG. 12, for example. Note that it is needless to say that the configuration of the transmission processing unit 112 is not limited to that in the example illustrated in FIG. 12.

The transmission device 100 has a configuration illustrated in FIG. 12, for example.

Here, the transmission device 100 generates the plurality of delay data pieces with different amounts of delay from the transmission data using the adjustment data generation unit 110. Also, the transmission device 100 subtracts reflection noise due to a stub that is mainly present on the outer side (that is, reflection noise after data transition) from the transmission data on the basis of the generated adjustment data using the transmission processing unit 112.

Therefore, since the first transmission signal obtained by subtracting the reflection noise after the data transition in advance is transmitted from the transmission device 100, the influences of the reflection noise due to a stub that is mainly present on the outer side when seen from the transmission device 100 are reduced in the system 1000 that has the transmission device 100.

Therefore, according to the transmission device 100, it is possible to prevent the waveform quality at the portion after the data transition from being degraded and to thereby improve signal quality in a case in which the transmission data is delivered via the multipoint bus.

Also, "the system 1000 capable of improving signal quality in the case in which the transmission data is delivered via the multipoint bus" is realized by the transmission device 100.

As described above by exemplifying the existing system, the waveform quality at the portion after the data transition may be degraded depending on the positional relationship between the transmission device and the reception device in the ON state and the transmission device in the OFF state in the multipoint bus, for example. In the case in which the transmission device 100 is included in the transmission devices that form the system 1000, each transmission device 100 reduces the influences of the reflection noise after the data transition to correspond to the positional relationship between the reception device and the other transmission devices in the multipoint bus. Each transmission device 100 reduces the influences of the reflection noise after the data transition to correspond to the aforementioned positional relationship by generating the adjustment data corresponding to the aforementioned positional relationship or the like, for example.

Note that the configuration of the transmission device according to the first embodiment is not limited to that in the example illustrated in FIG. 12. For example, the transmission device according to the first embodiment may have a configuration that does not include the transmission data generation unit 102 as described above.

[II] Transmission Device According to Second Embodiment

Next, a transmission device capable of realizing a method of preventing waveform quality at a portion during data transition from being degraded will be described as a transmission device according to a second embodiment.

Figure 18:
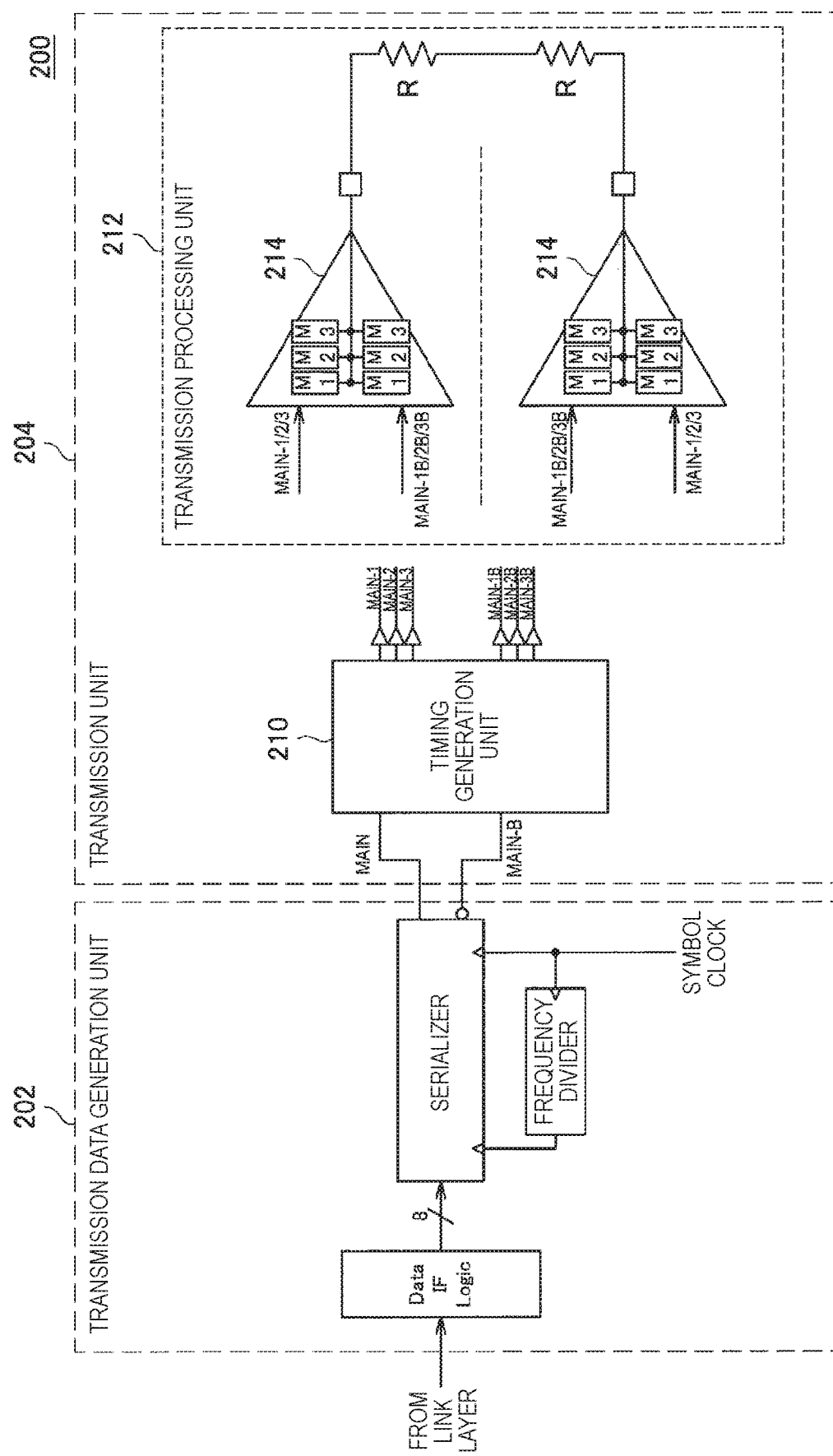
FIG. 18 is a block diagram illustrating an example of a configuration of a transmission device according to a second embodiment.

FIG. 18 is a block diagram illustrating an example of a configuration of a transmission device 200 according to the second embodiment. The transmission device 200 includes a transmission data generation unit 202 and a transmission unit 204, for example.

In addition, the transmission device 200 may include a device in accordance with an application example of the transmission device according to the embodiment, which will be described later, similarly to the transmission device according to the first embodiment, for example. Hereinafter, a case in which the transmission device 200 functions as an image sensor and transits image data as transmission data similarly to the transmission device according to the first embodiment will be exemplified.

The transmission data generation unit 202 has a data interface logic circuit that receives a data signal from an upper layer (such as a link layer), a serializer, and a frequency divider, for example, and generates transmission data. The transmission data generation unit 202 generates transmission data by converting an analog signal generated by the sensor device into serial data, for example.

Note that the configuration of the transmission data generation unit 202 is not limited to that in the example illustrated in FIG. 18 and an arbitrary configuration capable of generating transmission data can be employed.

Also, the transmission device 200 may not additionally include the transmission data generation unit 202 in a case in which a sensor device has a function of outputting image data similarly to the transmission device according to the first embodiment, for example. Also, the transmission device 200 may not include the transmission data generation unit 202 in a case in which data generated by an external device is transmitted as transmission data similarly to the transmission device according to the first embodiment, for example.

The transmission unit 204 plays a role of performing processing related to a method of preventing waveform quality at a portion during data transition from being degraded and has a function of transmitting a second transmission signal (a transmission signal with reduced influences of reflection noise during data transition in transmission data) on the basis of transmission data. The transmission unit 204 transmits the second transmission signal via a multipoint bus.

The transmission unit 204 is formed with "one processor or two or more processors formed with arithmetic circuits such as MPUs", "a dedicated circuit to realize the processing related to the method of preventing waveform quality at the portion during the data transition from being degraded", or the like, for example.

The transmission unit 204 includes a timing generation unit 210 and a transmission processing unit 212, for example.

The timing generation unit 210 generates timing data indicating a timing at which a waveform of a transmission signal is shaped on the basis of the transmission data. The timing generation unit 210 generates the timing data by causing the transmission data to delay.

As illustrated in FIGS. 11A and 11B, for example, it is necessary for the transmission device 200 to perform processing of the transmission processing unit 212, which will be described later, at or below 1 unit interval (UI) in order to prevent the waveform quality at the portion during the data transition from being degraded.

Thus, the timing generation unit 210 generates the timing data by causing the transmission data to delay with a delay element. In a case of generating a plurality of timing data pieces, the transmission device 200 generates the plurality of timing data pieces with different amounts of delay from the transmission data by including delay elements such that the number of the delay elements is the same as the number of the timing data pieces to be generated, for example.

Note that the method of generating the timing data is not limited to that in the example described above. For example, the timing generation unit 210 can use an arbitrary method by which it is possible to cause the transmission processing unit 212, which will be described later, to perform the processing at or below 1 UI.

Figure 19:
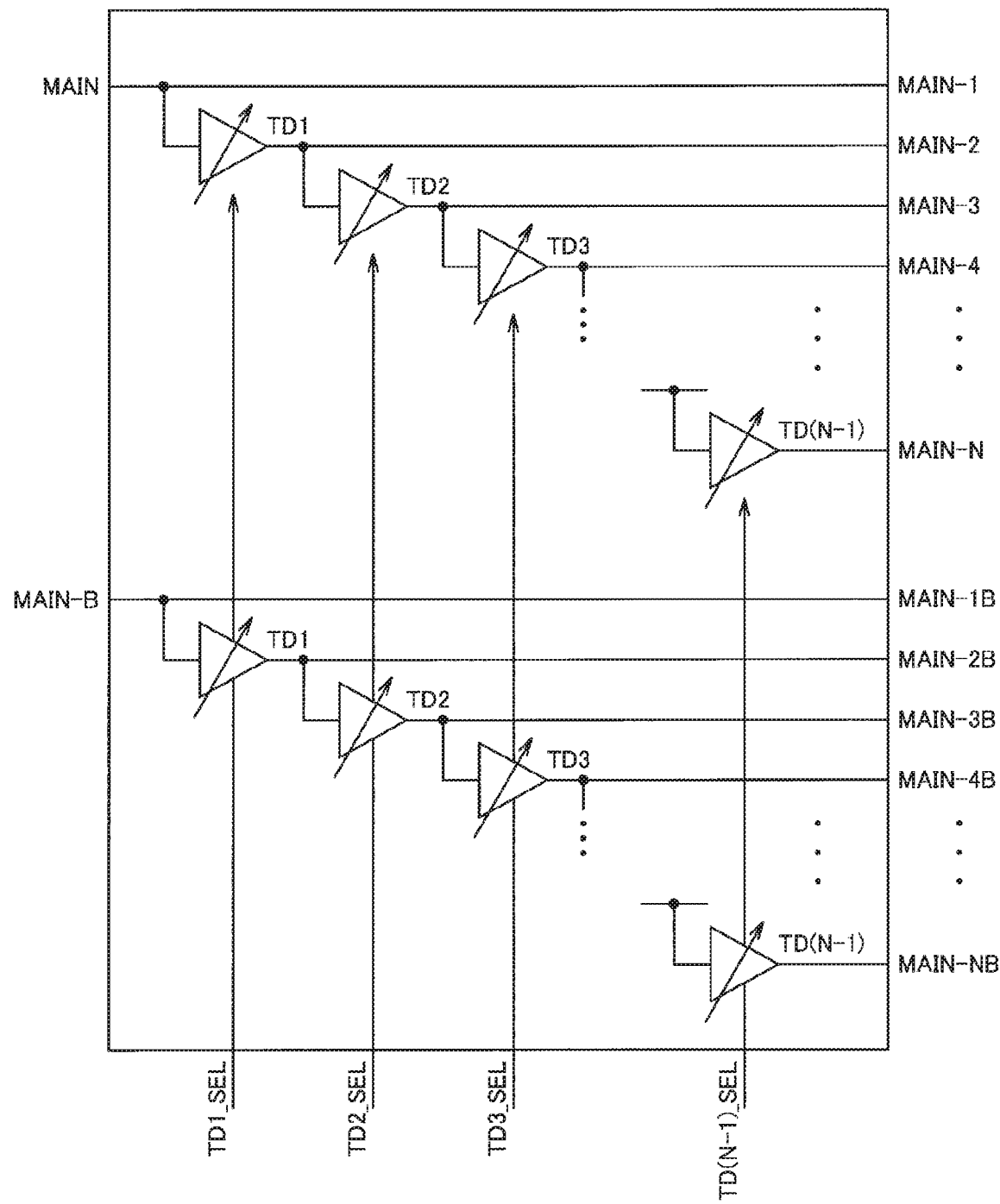
FIG. 19 is an explanatory diagram illustrating an example of a configuration of a timing generation unit provided in the transmission device according to the second embodiment.

FIG. 19 is an explanatory diagram illustrating an example of a configuration of the timing generation unit 210 included in the transmission device 200 according to the second embodiment. "MAIN" and "MAIN-1" illustrated in FIG. 19 represent transmission data while "MAIN-B" and "MAI-1B" illustrated in FIG. 19 represent data obtained by bit-inverting the transmission data. Also, "MAIN-2", "MAIN-2B", "MAIN-3", "MAIN-3B", . . . , "MAIN-N" (N is an integer that is equal to or greater than two), "MAIN-NB" illustrated in FIG. 19 represent timing data. As illustrated in FIG. 19, "MAIN-2B", . . . , "MAIN-NB" illustrated in FIG. 19 correspond to data obtained by bit-inverting "MAIN-2", . . . , "MAIN-N", respectively.

The timing generation unit 210 generates timing data using delay elements TD1 to TD (N-1) with variable amounts of delay. Here, the timing generation unit 210 controls the amounts of delay of the respective delay elements with data indicating the amounts of delay of the respective delay elements stored in a register (not illustrated), for example.

The timing generation unit 210 generates the timing data by having the configuration illustrated in FIG. 19, for example. Note that it is needless to say that the configuration of the timing generation unit 210 is not limited to that in the example illustrated in FIG. 19.

Referring again to FIG. 18, an example of a configuration of the transmission unit 204 will be described. The transmission processing unit 212 transmits the second transmission signal on the basis of the transmission data and the timing data.

The transmission processing unit 212 subtracts reflection noise during data transition from a waveform of a signal corresponding to the transmission data on the basis of the timing data and transmits the transmission signal. In the transmission processing unit 212, subtraction of the reflection noise during the data transition based on the timing data is performed by the driver circuit 214.

Figure 20:
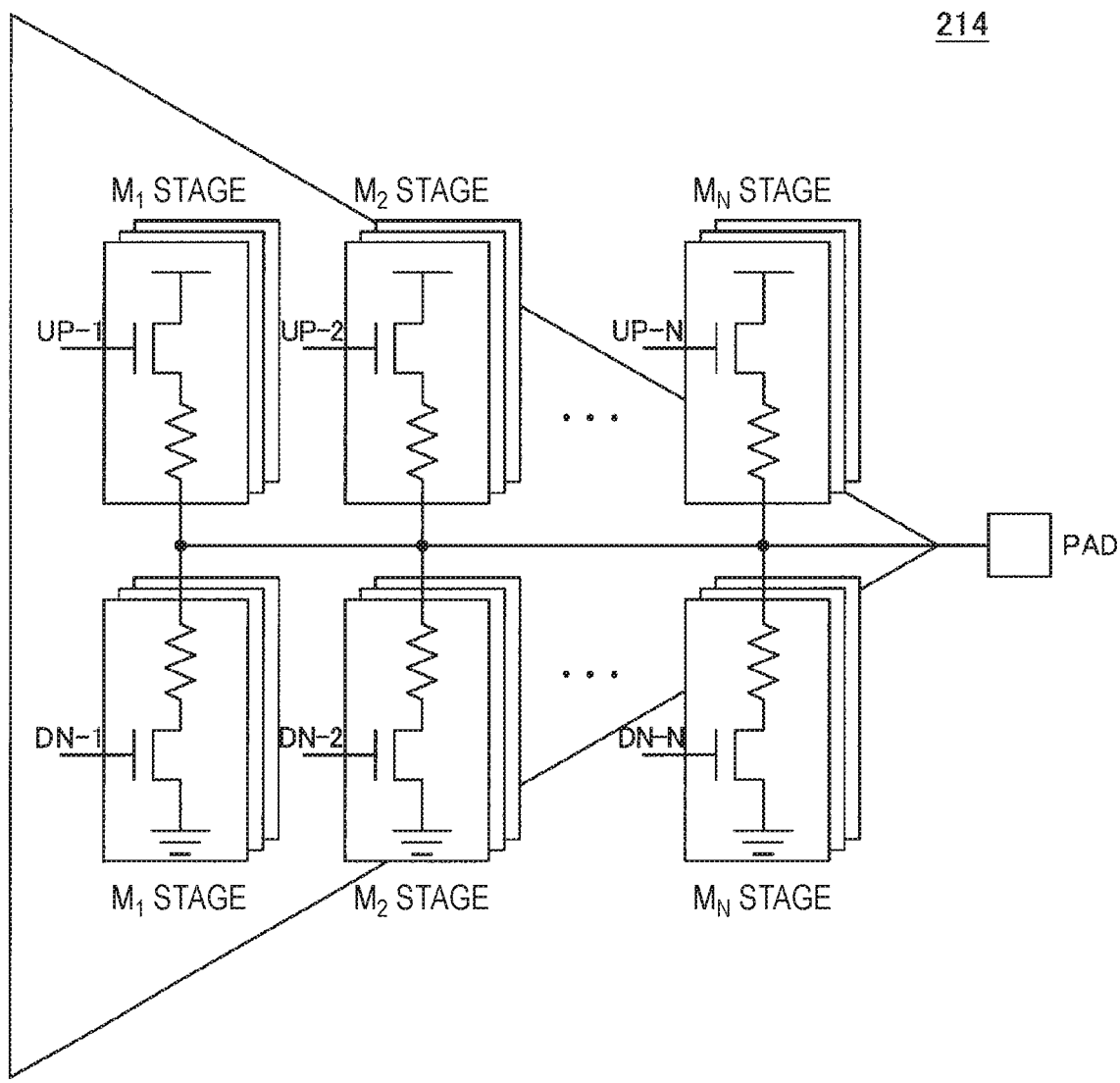
FIG. 20 is an explanatory diagram illustrating an example of a configuration of a driver circuit provided in the transmission device according to the second embodiment.

FIG. 20 is an explanatory diagram illustrating an example of a configuration of the driver circuit 214 provided in the transmission device 200 according to the second embodiment.

The driver circuit 214 includes N groups of driver circuit in an "$M_1$ stage", an "$M_2$ stage", . . . , and "$M_N$ stage", for example.

The number of stages of the driver circuit in each group is adjusted in accordance with shaping of a desired waveform. For example, the transmission processing unit 212 adjusts the number of stages of the driver circuit in each group with data that is stored in a register (not illustrated) and is related to reflection noise due to a stub that is mainly present on the inner side (hereinafter, referred to as "data related to reflection noise"). Examples of the data related to reflection noise according to the embodiment include data that can be used to shape the waveform, such as data indicating a timing at which a transmitted signal is distorted due to reflection caused by a stub that is mainly present on the inner side, for example. The aforementioned data related to reflection noise is obtained by simulation or the like, for example.

Hereinafter, the driver circuit represented as the "$M_1$ stage", the driver circuit represented as the "$M_2$ stage", the driver circuit represented as the "M₃ stage", . . . will be represented as "M₁", "M₂", "M₃", . . . , respectively, in some cases.

The driver circuit 214 illustrated in FIG. 18, that is, the driver circuit 214 in which the number of groups of the drivers is 3 will be exemplified. Each driver circuit operates with data described below.

Driver circuit represented as "M1": transmission data represented as "MAIN-1" in FIG. 18 or data obtained by bit-inverting the transmission data represented as "MAIN-1B" in FIG. 18

Driver circuit represented as "M2": timing data represented as "MAIN-2" in FIG. 18 or timing data represented as "MAIN-2B" in FIG. 18

Driver circuit represented as "M3": timing data represented as "MAIN-3" in FIG. 18 or timing data represented as "MAIN-3B" in FIG. 18

Here, an example of operations of the transmission processing unit 212 will be described by exemplifying operations during a step response.

Figure 21:
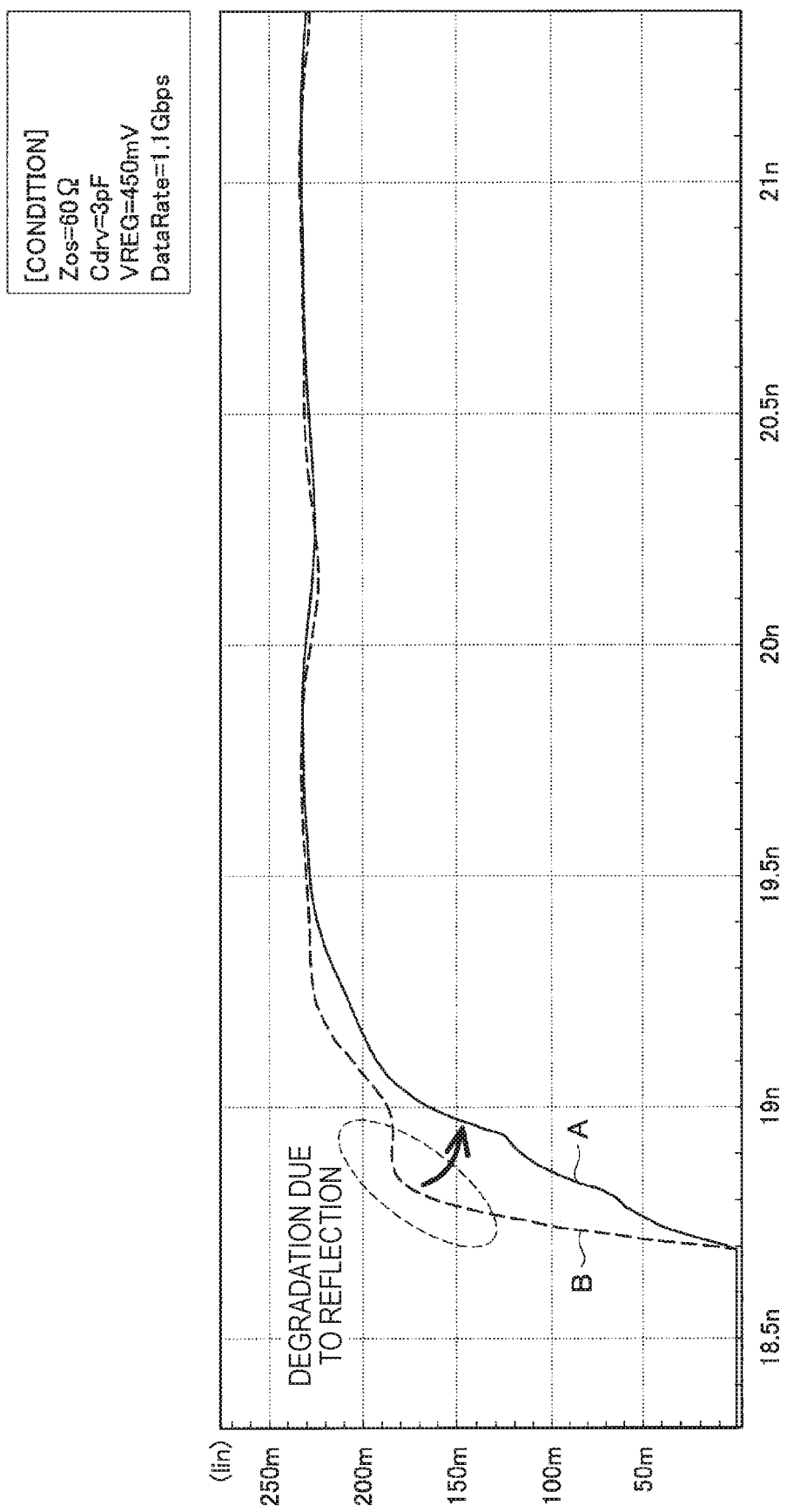
FIG. 21 is an explanatory diagram for describing an example of operations of a transmission processing unit provided in the transmission device according to the second embodiment.
Figure 22:
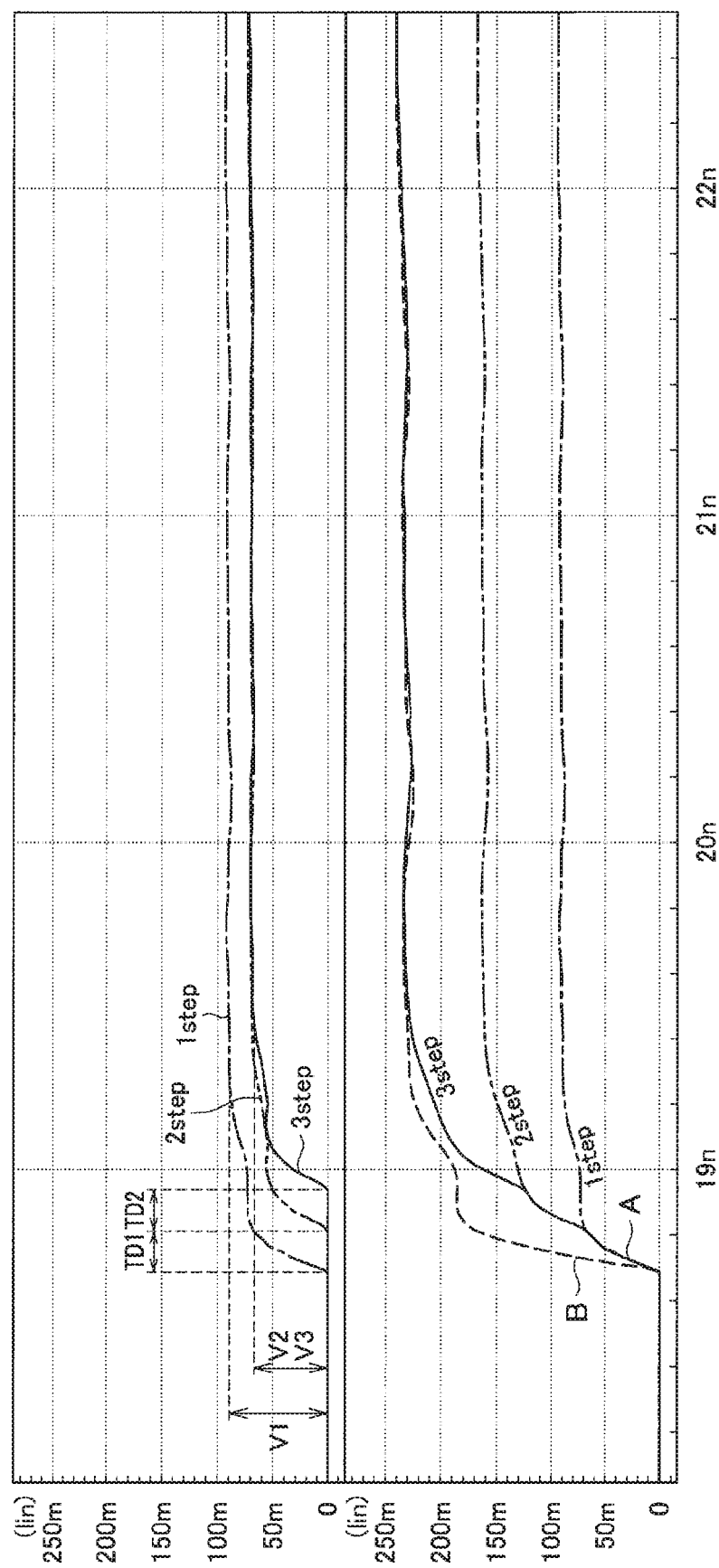
FIG. 22 is an explanatory diagram for describing an example of operations of the transmission processing unit provided in the transmission device according to the second embodiment.

FIGS. 21 and 22 are explanatory diagrams for describing an example of operations of the transmission processing unit 212 provided in the transmission device 200 according to the second embodiment.

FIG. 21 illustrates an example of an input waveform during data transition in a signal received by the reception device in the system 1000 that has the transmission device 200. Also, FIG. 21B illustrates an example of an input waveform during data transition in a signal received by the reception device in the existing system. Here, FIGS. 21A and 21B illustrates the examples of input waveforms in a case in which the transmission device that transmits the transmission signal is the transmission device represented as TX2 in FIGS. 1A and 1B and the stub length is "long".

FIG. 22 illustrates operations of the transmission processing unit 212 that has the driver circuit 214 illustrated in FIG. 18, that is, the driver circuit 214 in which the number of groups of drivers is three. Here, A of FIG. 22 illustrates an input waveform corresponding to A of FIG. 21 while B of FIG. 22 illustrates an input waveform corresponding to B of FIG. 21.

The transmission processing unit 212 that has the driver circuit 214 illustrated in FIG. 18 transmits signals in three stages as illustrated as a first step, a second step, and a third step in FIG. 22. More specifically, the transmission processing unit 212 transmits the signal of the second step at a timing at which the signal transmitted in the first step is distorted due to reflection. Also, the transmission processing unit 212 transmits the signal of the third step at the timing at which the signal transmitted in the second step is distorted due to reflection.

Here, "transmitting the signal in the next step at the timing at which the signal transmitted in a certain step is distorted due to reflection" corresponds to "subtracting reflection noise during data transition from the waveform of the signal corresponding to the transmission data" as illustrated in FIG. 22, for example.

Degradation due to reflection that is caused by a stub that is mainly present on the inner side when seen from the transmission device 200 is suppressed as illustrated in FIG. 21 in the reception device that has received the second transmission signal transmitted from the transmission device 200 by the transmission processing unit 212 transmitting the signal as illustrated in FIG. 22, for example.

The transmission device 200 can transmit the second transmission signal obtained by subtracting reflection noise during data transition from the waveform of the signal corresponding to the transmission data such that the input waveform during the data transition in the signal received by the reception device becomes more linear by the transmission processing unit 212 operating as illustrated in FIG. 22, for example. Note that it is needless to say that the operations of the transmission processing unit 212 are not limited to those in the example illustrated in FIG. 22.

The transmission processing unit 212 transmits the second transmission signal by having the configuration illustrated in FIG. 18, for example. Note that it is needless to say that the configuration of the transmission processing unit 212 is not limited to that in the example illustrated in FIG. 18.

The transmission device 200 has the configuration illustrated in FIG. 18, for example.

Here, the transmission device 200 generates the timing data from the transmission data using the timing generation unit 210. Also, the transmission device 200 subtracts reflection noise due to a stub that is mainly present on the inner side (that is, reflection noise during data transition) from the waveform of the signal corresponding to the transmission data on the basis of the generated timing data using the transmission processing unit 212.

Therefore, since the second transmission signal obtained by subtracting the reflection noise during the data transition from the waveform of the signal corresponding to the transmission data is transmitted from the transmission device 200, influences of the reflection noise due to a stub that is mainly present on the inner side when seen from the transmission device 200 are reduced in the system 1000 that has the transmission device 200.

Therefore, since the transmission device 200 can prevent waveform quality at the portion during the data transition from being degraded, it is possible to improve signal quality in a case in which the transmission data is delivered via the multipoint bus.

Also, "the system 1000 capable of improving signal quality in the case in which the transmission data is delivered via the multipoint bus" is realized by the transmission device 200.

As described above by exemplifying the existing system, the waveform quality at the portion during the data transition may be degraded depending on the positional relationship between the transmission device and the reception device in the ON state and the transmission device in the OFF state in the multipoint bus, for example. In the case in which the transmission device 200 is included in the transmission devices that form the system 1000, each transmission device 200 reduces influences of the reflection noise during the data transition to correspond to the positional relationship between the reception device and the other transmission devices in the multipoint bus. Each transmission device 200 reduces the influences of the reflection noise during the data transition to correspond to the aforementioned positional relationship by generating the timing data corresponding to the aforementioned positional relationship or the like, for example.

Note that the configuration of the transmission device according to the second embodiment is not limited to that in the example illustrated in FIG. 18. For example, the transmission device according to the second embodiment may have a configuration that does not include the transmission data generation unit 202 as described above.

[III] Transmission Device According to Third Embodiment

Next, a transmission device capable of realizing a method of preventing waveform quality at a portion after data transition from being degraded and a method of preventing waveform quality at a portion during the data transition from being degraded will be described as a transmission device according to the third embodiment.

Figure 23:
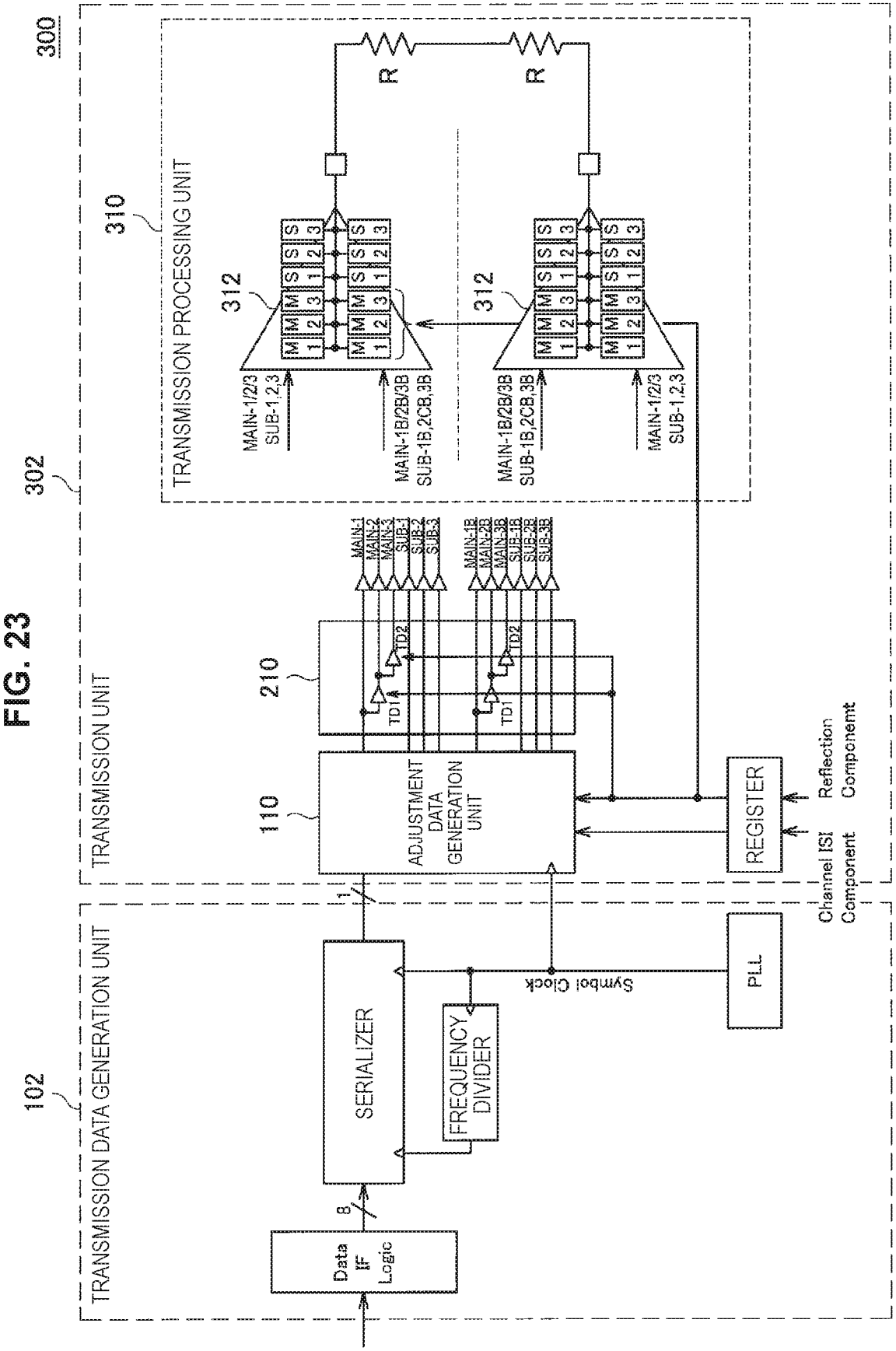
FIG. 23 is a block diagram illustrating an example of a configuration of a transmission device according to a third embodiment.

FIG. 23 is a block diagram illustrating an example of a configuration of a transmission device 300 according to a third embodiment. The transmission device 300 includes a transmission data generation unit 102 and a transmission unit 302, for example.

In addition, the transmission device 300 may include a device in accordance with an application example of the transmission device according to the embodiment, which will be described later, similarly to the transmission device according to the first embodiment, for example.

The transmission data generation unit 102 has a configuration that is similar to that of the transmission data generation unit 102 illustrated in FIG. 13, for example, and generates transmission data. FIG. 23 further illustrates a PLL circuit that generates a symbol clock.

Note that the configuration of the transmission data generation unit 102 is not limited the example illustrated in FIG. 23 and an arbitrary configuration capable of generating transmission data can be employed.

In addition, the transmission device 300 may not additionally include the transmission data generation unit 102 in a case in which a sensor device has a function of outputting image data similarly to the transmission device according to the first embodiment, for example. Also, the transmission device 300 may not include the transmission data generation unit 102 in a case in which data generated by an external device is transmitted as transmission data similarly to the transmission device according to the first embodiment, for example.

The transmission unit 302 has the functions of the transmission unit 104 according to the first embodiment and the functions of the transmission unit 204 according to the second embodiment and plays a role of performing the processing related to the method of preventing waveform quality at the portion after the data transition from being degraded and the processing related to the method of preventing waveform quality at the portion during the data transition from being degraded. That is, the transmission unit 302 has a function of transmitting "transmission signal with reduced influences of reflection noise after the data transition in the transmission data and with reduced influences of reflection noise during the data transition in the transmission data" (hereinafter, also referred to as a "third transmission signal" in some cases) on the basis of the transmission data. The transmission unit 302 transmits the third transmission signal via a multipoint bus.

A transmission unit 304 is formed with "one processor or two or more processors formed with arithmetic circuits such as MPUs", "a dedicated circuit to realize the processing related to the method of preventing waveform quality at the portion after the data transition from being degraded and the processing related to the method of preventing waveform quality at the portion during the data transition from being degraded", or the like, for example.

The transmission unit 302 includes an adjustment data generation unit 110, a timing generation unit 210, and a transmission processing unit 310. Also, FIG. 23 further illustrates a register in which data indicating the amount of delay of a delay element, data related to reflection noise, and the like are stored.

The adjustment data generation unit 110 has functions and a configuration that are similar to those of the adjustment data generation unit 110 illustrated in FIG. 12.

The timing generation unit 210 has functions and a configuration that are similar to those of the timing generation unit 210 illustrated in FIG. 18.

The transmission processing unit 310 transmits the third transmission signal on the basis of transmission data, adjustment data, and timing data.

The transmission processing unit 310 transmits the third transmission signal using the driver circuit 312 that has the functions of the driver circuit 114 illustrated in FIG. 12 and the function of the driver circuit 214 illustrated in FIG. 18. In one example, the transmission processing unit 310 transmits the third transmission signal by operating as illustrated in FIGS. 17A and 17B and also operating as illustrated in FIG. 22, for example.

The transmission device 300 has a configuration illustrated in FIG. 23, for example.

Here, the transmission device 300 subtracts, from the transmission data, reflection noise due to a stub that is mainly present on the outer side on the basis of generated adjustment data similarly to the transmission device 100 illustrated in FIG. 12. Also, the transmission device 300 subtracts the reflection noise due to a stub that is mainly present on the inner side from the waveform of the signal corresponding to the transmission data on the basis of generated timing data similarly to the transmission device 200 illustrated in FIG. 18.

Therefore, since "the third transmission signal obtained by subtracting the reflection noise after the data transition in advance and subtracting the reflection noise during the data transition from the waveform of the signal corresponding to the transmission data" is transmitted from the transmission device 100, influences of the reflection noise due to a stub that is mainly present on the outer side when seen from the transmission device 300 and influences of the reflection noise due to a stub that is mainly present on the inner side when seen from the transmission device 300 are reduced in the system 1000 that has the transmission device 300.

Therefore, the transmission device 300 can prevent the waveform quality at the portion after the data transition from being degraded and can prevent the waveform quality at the portion during the data transition from being degraded, it is possible to improve signal quality in a case in which transmission data is delivered via the multipoint bus.

In addition, "the system 1000 capable of improving signal quality in the case in which transmission data is delivered via the multipoint nus" is realized by the transmission device 300.

As described above by exemplifying the existing system, one of or both the waveform quality at the portion during the data transition and the waveform quality at the portion after the data transition may be degraded depending on the positional relationship between the transmission device and the reception device in the ON state and the transmission device in the OFF state in the multipoint bus, for example. In a case in which the transmission device 300 is included in the transmission devices that form the system 1000, each transmission device 300 reduces the influences of the reflection noise during the data transition and the influences of the reflection noise after the data transition to correspond to the positional relationship between the reception device and the other transmission devices in the multipoint bus. Each transmission device 300 reduces the influence of the reflection noise during the data transition and the influences of the reflection noise after the data transition to correspond to the aforementioned positional relationship by generating timing data corresponding to the aforementioned positional relationship, generating adjustment data corresponding to the aforementioned positional relationship, and the like, for example.

[IV] Example of Advantages Achieved by Transmission Device According to Embodiment Next, an example of advantages achieved by the transmission devices according to the first to third embodiments as described above will be described by describing simulation results. Hereinafter, simulation results in the system 1000 illustrated in FIGS. 1A and 1B will be described along with simulation results in the existing system under the same conditions as those of the system 1000.

Also, hereinafter, an example of the advantages achieved by the transmission device according to the embodiments will be described by mainly describing the simulation result in a case in which the transmission device according to the third embodiment is applied and describing representative examples for simulation results in a case in which the transmission device according to the first embodiment and the transmission device according to the second embodiment are applied, respectively.

[A] Example of Advantages Achieved by Transmission Device According to Third Embodiment First, an example of advantages achieved by the transmission device according to the third embodiment will be described. The simulation results described below are results obtained under "conditions of a state in which the double-termination technology and the SSTL technology are effective and a "long" stub length".

Figure 24B:
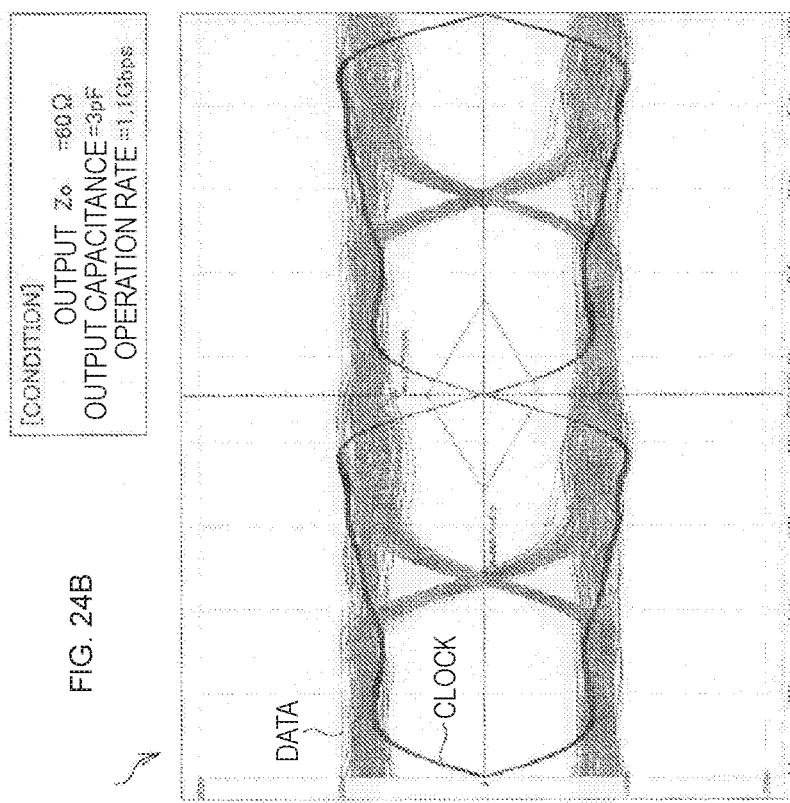
FIGS. 24A and 24B are explanatory diagrams illustrating an example of advantages achieved by the transmission device according to the third embodiment.
Figure 24A:
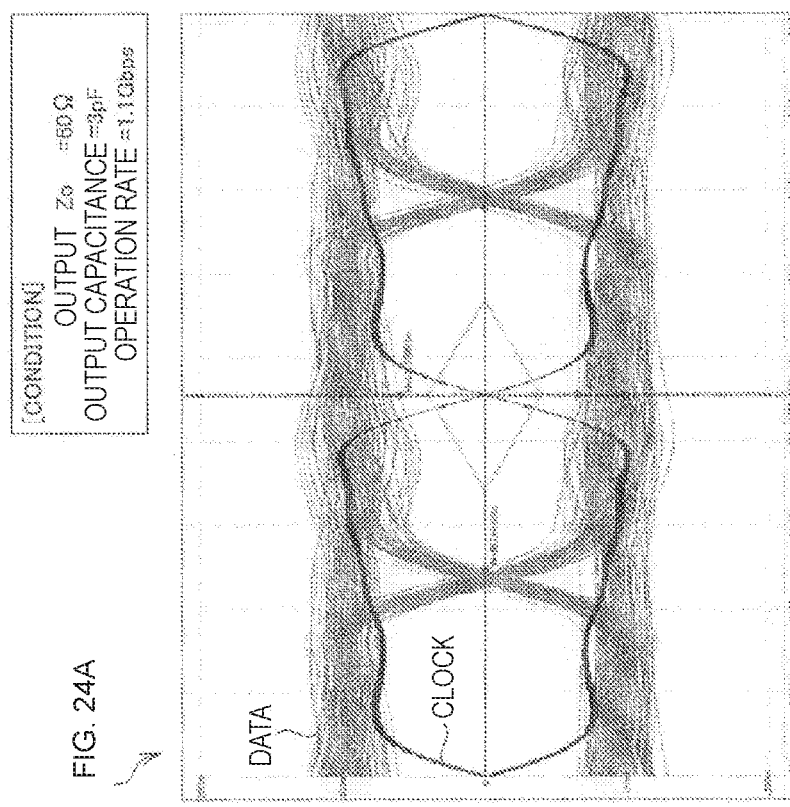

FIGS. 24A and 24B are explanatory diagrams illustrating an example of advantages achieved by the transmission device according to the third embodiment and illustrates an example of results of simulating how data transmitted from the transmission device represented as TX1 is received by the reception device.

FIG. 24A illustrates simulation results in the existing system while FIG. 24B illustrates simulation results in the system 1000.

As illustrated in FIGS. 24A and 24B, it is recognized that a margin has been enlarged in the amplitude direction as compared with the existing system by the third transmission signal being transmitted from the transmission device according to the third embodiment.

Figure 25A:
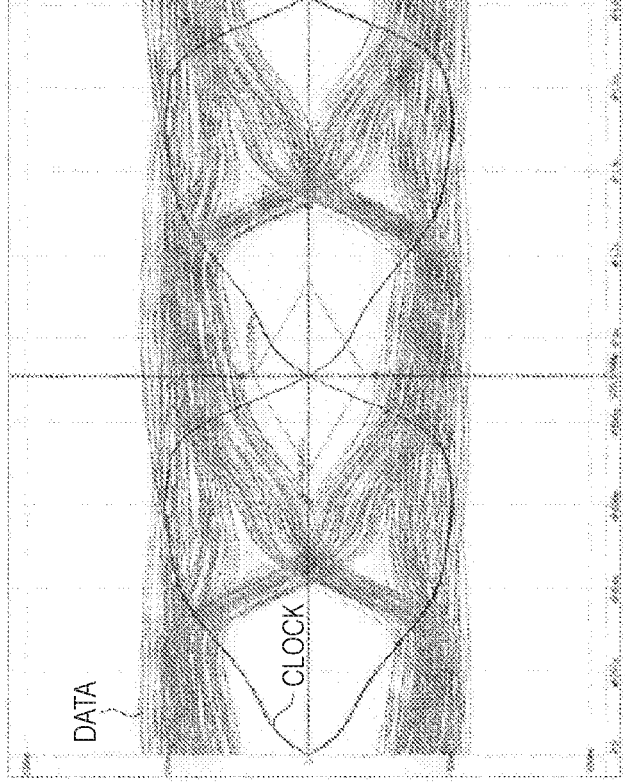
FIGS. 25A and 25B are explanatory diagrams illustrating an example of advantages achieved by the transmission device according to the third embodiment.
Figure 25B:
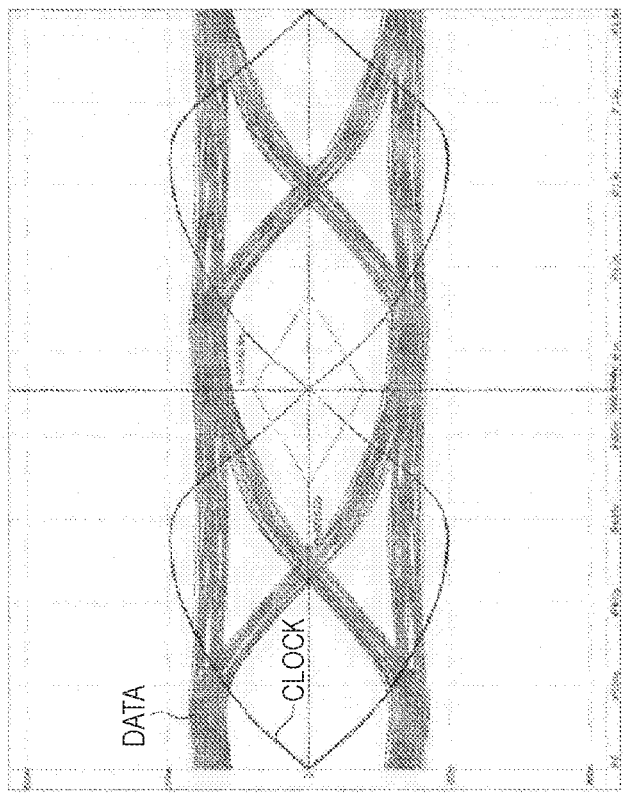

FIGS. 25A and 25B are explanatory diagrams illustrating an example of advantages achieved by the transmission device according to the third embodiment and illustrates an example of results of simulating how data transmitted from the transmission device represented as TX2 is received by the reception device.

FIG. 25A illustrates simulation results in the existing system while FIG. 25B illustrates simulation results in the system 1000.

As illustrated in FIGS. 25A and 25B, it is recognized that waveform quality has significantly been improved as compared with the existing system by the third transmission signal being transmitted from the transmission device according to the third embodiment.

Figure 26A:
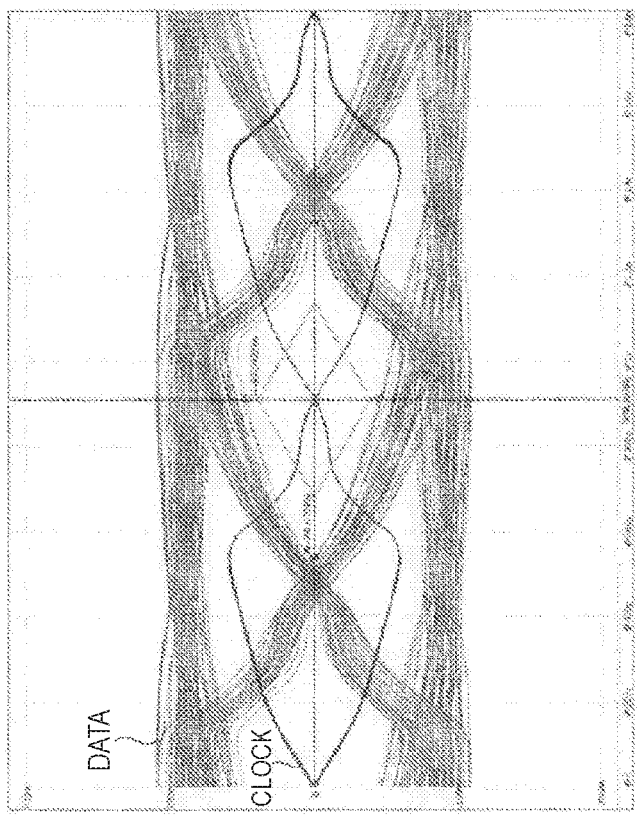
FIGS. 26A and 26B are explanatory diagrams illustrating an example of advantages achieved by the transmission device according to the third embodiment.
Figure 26B:
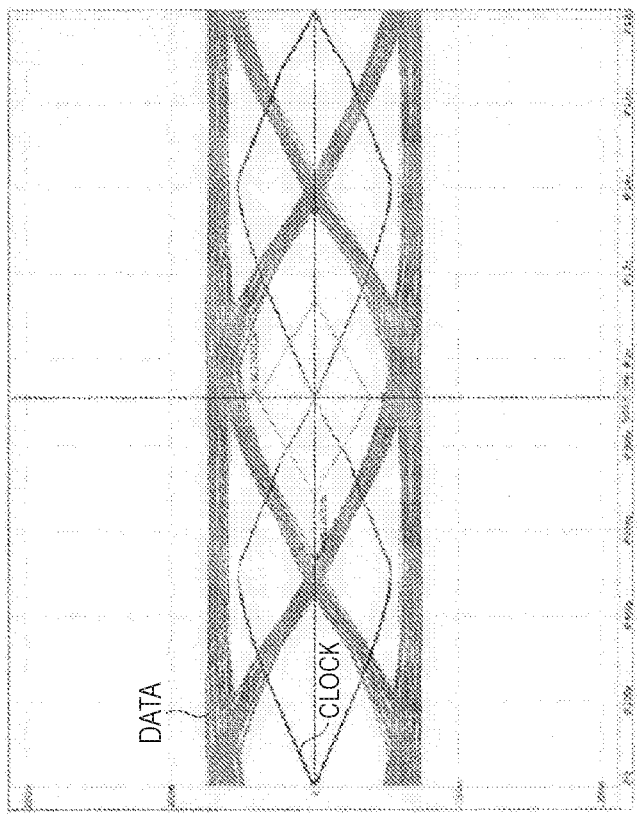

FIGS. 26A and 26B are explanatory diagrams illustrating an example of advantages achieved by the transmission device according to the third embodiment and illustrates an example of results of simulating how data transmitted form the transmission device represented as TX3 is received by the reception device.

FIG. 26A illustrates simulation results in the existing system while FIG. 26B illustrates simulation results in the system 1000.

As illustrated in FIGS. 26A and 26B, it is recognized that waveform quality has significantly been improved as compared with the existing system by the third transmission signal being transmitted from the transmission device according to the third embodiment.

FIGS. 27A and 27B are explanatory diagrams illustrating an example of advantages achieved by the transmission device according to the third embodiment and illustrates an example of results of simulating how data transmitted from the transmission device represented as TX4 is received by the reception device.

FIG. 27A represents simulation results in the existing system while FIG. 27B represents simulation results in the system 1000.

As illustrated in FIGS. 27A and 27B, it is recognized that waveform quality has significantly been improved as compared with the existing system by the third transmission signal being transmitted from the transmission device according to the third embodiment.

Figure 28B:
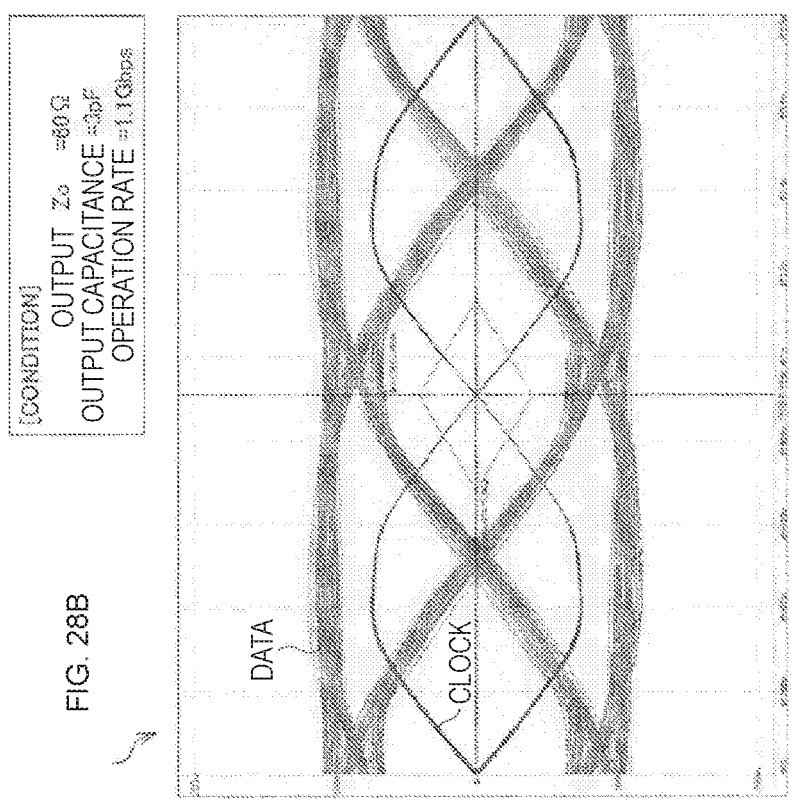
FIGS. 28A and 28B are explanatory diagrams illustrating an example of advantages achieved by the transmission device according to the third embodiment.
Figure 28A:
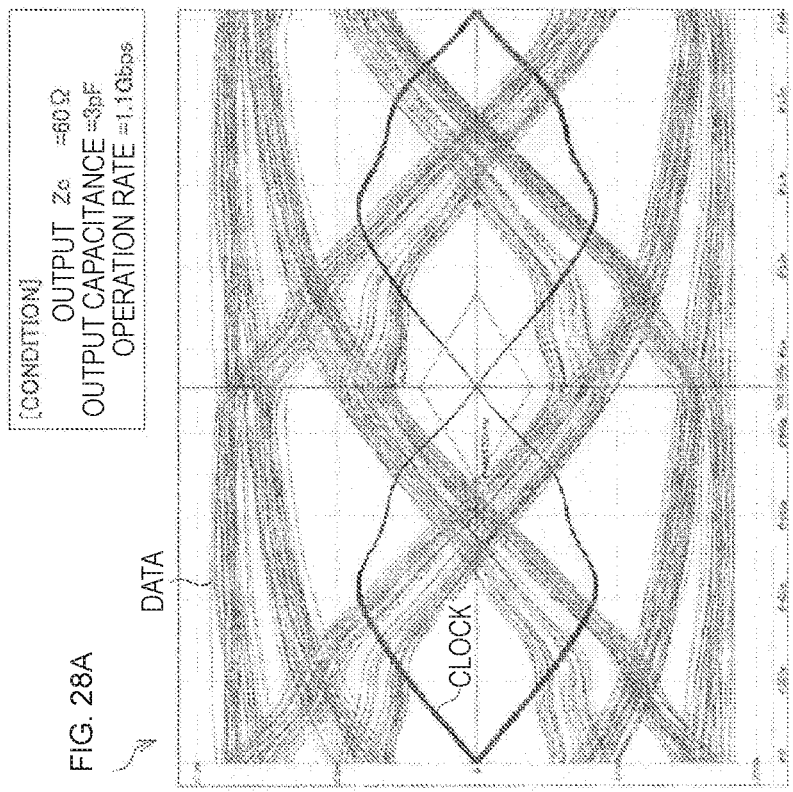

FIGS. 28A and 28B are explanatory diagrams illustrating an example of advantages achieved by the transmission device according to the third embodiment and illustrates an example of results of simulating how data transmitted from the transmission device represented as TX5 is received by the reception device.

FIG. 28A illustrates simulation results in the existing system while FIG. 28B illustrates simulation results in the system 1000.

As illustrated in FIGS. 28A and 28B, it is recognized that waveform quality has significantly been improved as compared with the existing system by the third transmission signal being transmitted from the transmission device according to the third embodiment.

As illustrated in FIGS. 24A, 24B, 25A, 25B, 26A, 26B, 27A, 27B, 28A, and 28B, for example, improvement in signal quality in a case in which transmission data is delivered via the multipoint bus is realized in the system 1000 that has the transmission device according to the third embodiment.

[B] Example of Advantages Achieved by Transmission Device According to First Embodiment Next, an example of advantages achieved by the transmission device according to the first embodiment will be described. The simulation results described below are results obtained under "conditions of a "long" stub length and a data rate of '1.1 [Gbps]'".

Figure 29A:
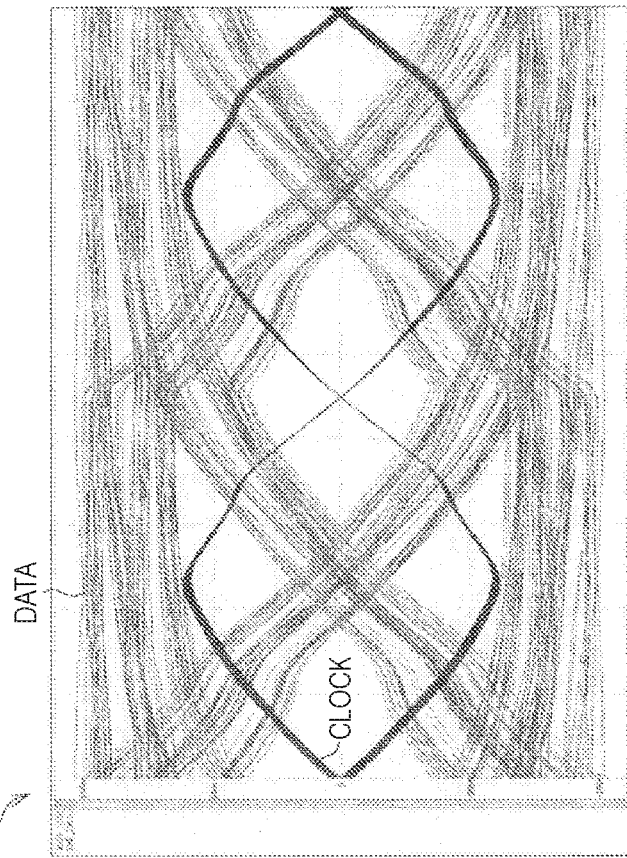
FIGS. 29A and 29B are explanatory diagrams illustrating an example of advantages achieved by the transmission device according to the first embodiment.
Figure 29B:
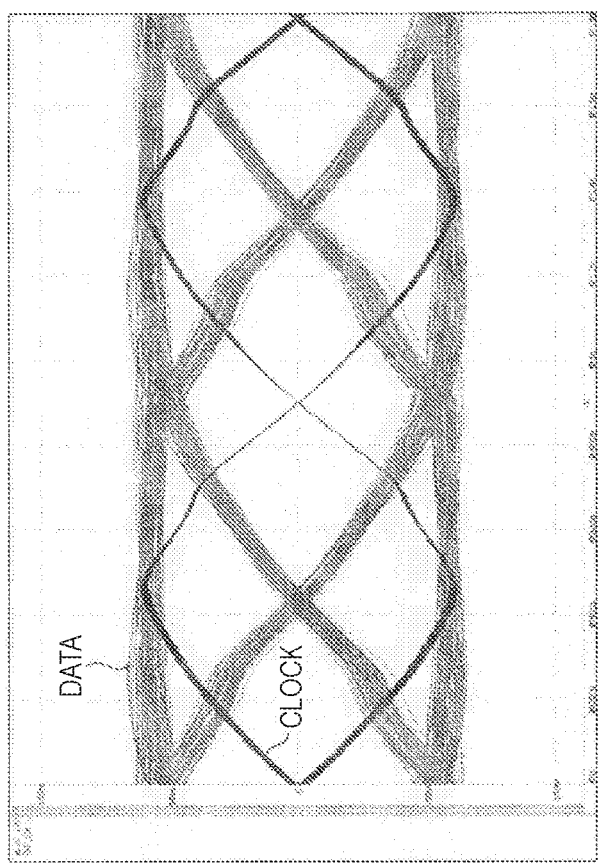

FIGS. 29A and 29B are explanatory diagrams illustrating an example of advantages achieved by the transmission device according to the first embodiment and illustrates an example of results of simulating how data transmitted by the transmission device represented as TX4 is received by the reception device.

FIG. 29A illustrates simulation results in the existing system while FIG. 29B illustrates simulation results in the system 1000.

As illustrated in FIGS. 29A and 29B, it is recognized that inter-symbol interference (ISI) due to reflection noise after data transition has significantly been reduced as compared with the existing system by the first transmission signal being transmitted from the transmission device according to the first embodiment.

Therefore, as illustrated in FIGS. 29A and 29B, for example, improvement in signal quality in a case in which transmission data is delivered via the multipoint bus is realized in the system 1000 that has the transmission device according to the first embodiment.

[C] Example of Advantages Achieved by Transmission Device According to Second Embodiment Next, an example of advantages achieved by the transmission device according to the second embodiment will be described. The simulation results described below are results obtained under "a "long" stub length and a data rate of '1.1 [Gbps]'".

Figure 30B:
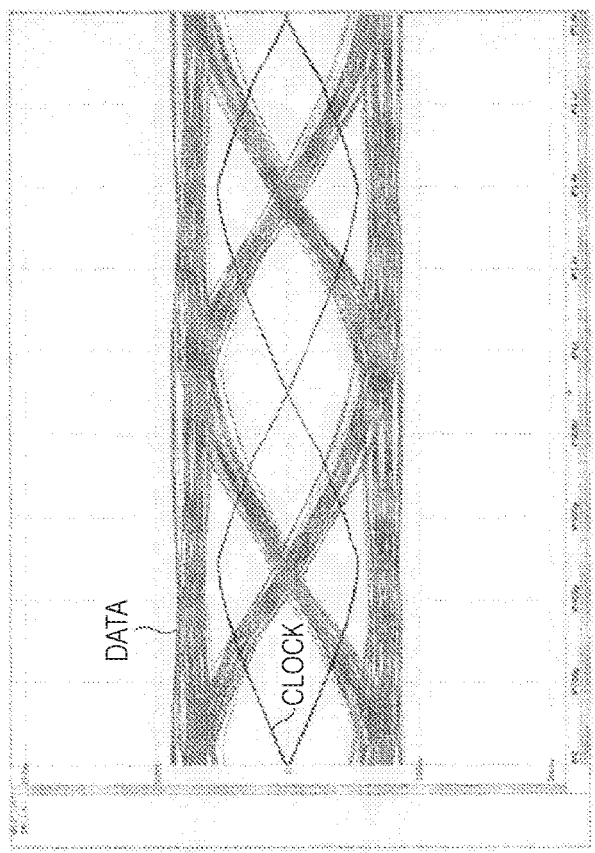
FIGS. 30A and 30B are explanatory diagrams illustrating an example of advantages achieved by the transmission device according to the second embodiment.
Figure 30A:
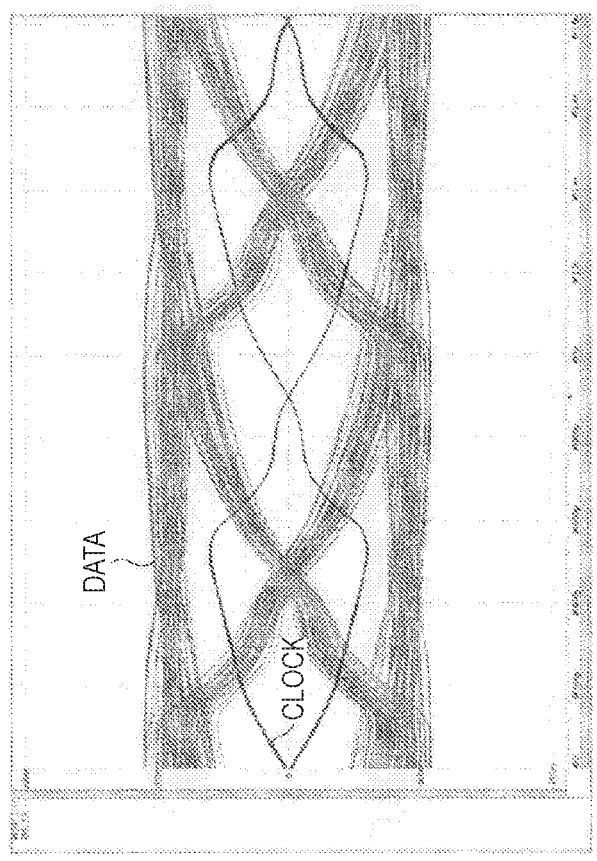

FIGS. 30A and 30B are explanatory diagrams illustrating an example of advantages achieved by the transmission device according to the second embodiment and illustrates an example of results of simulating how data transmitted from the transmission device represented as TX3 is received by the reception device.

FIG. 30A illustrates simulation results in the existing system while FIG. 30B illustrates simulation results in the system 1000.

As illustrated in FIGS. 30A and 30B, it is recognized that degradation due to reflection noise during data transition has significantly been reduced as compared with the existing system by the second transmission signal being transmitted from the transmission device according to the second embodiment.

Therefore, as illustrated in FIGS. 30A and 30B, for example, improvement in signal quality in a case in which transmission data is delivered via the multipoint bus is realized in the system 1000 that has the transmission device according to the second embodiment.

[V] Provision Example of System, Transmission Device, and Reception Device According to Embodiments Although the system has been exemplified and described above in the embodiments, the embodiments are not limited to such modes. The embodiments can be applied to various electronic devices including "a drone", "a mobile body such as a vehicle", "a variety of wearable devices that are used by users attaching them on their bodies, such as a head mounted display, an eyewear of a glasses type, a watch-type device, and a bracelet-type device", "a communication device such as a smartphone", "a computer such as a personal computer (PC)", "a device of a tablet type", "a game console", and the like, for example.

Also, although the transmission device has been exemplified and described as an element that forms the system, the embodiments are not limited to such modes. The embodiments can be applied to a variety of electronic devices capable of transmitting data in accordance with provided functions, such as an image sensor, a motion sensor such as an acceleration sensor or an angular speed sensor, or the like, for example, via a transmission line. In addition, the embodiments may be applied to a communication device that is connected to an external sensor device, such as an image sensor, a motion sensor, or the like, for example, and transmits data indicating detection results of the sensor device via a transmission line.

In addition, although the reception device has been exemplified and described as an element that forms the system, the embodiments are not limited to such modes. The embodiments can be applied to "a processing device such as a processor or the like" and "an arbitrary processing circuit or an arbitrary device capable of processing data output from each of a plurality of transmission devices connected to a transmission line via the transmission line", for example.

Program According to Embodiment

The system capable of improving signal quality in a case in which transmission data is delivered via a multipoint bus (a transmission line to which a plurality of transmission devices is connected) is realized by a program that is for causing a computer to function as the transmission device according to the embodiment (for example, a program that causes the computer to function as any of the transmission device according to the first embodiment, the transmission device according to the second embodiment, and the transmission device according to the third embodiment) being executed by a processor or the like in the computer.

In addition, it is possible to achieve the advantages, which can be achieved by the transmission device according to the aforementioned embodiments (the transmission device according to the first embodiment, the transmission device according to the second embodiment, or the transmission device according to the third embodiment) being applied, by the program that is for causing the computer to function as the transmission device according to the embodiment being executed by the processor or the like in the computer.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, although the above description has showed that the program (computer program) for causing the computer to function as the transmission device according to the embodiment is provided, the embodiment can further provide a recording medium that is caused to store the aforementioned program therein.

The aforementioned configurations illustrate exemplary embodiments, and it is a matter of course that the configurations belong to the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A transmission device including:

a transmission unit that has a function of transmitting a transmission signal with a reduced influence of reflection noise in transmission data after data transition on the basis of the transmission data.

(2)
The transmission device according to (1),
in which the transmission unit includes
an adjustment data generation unit that generates adjustment data that reduces the reflection noise after the data transition on the basis of the transmission data, and
a transmission processing unit that transmits the transmission signal on the basis of the transmission data and the adjustment data.

(3)
The transmission device according to (2), in which the adjustment data generation unit generates a plurality of pieces of delay data with different amounts of delay from the transmission data and generates the adjustment data on the basis of the transmission data and a plurality of pieces of the generated delay data.

(4)
The transmission device according to (2) or (3), in which the transmission processing unit subtracts the reflection noise after the data transition from the transmission data on the basis of the adjustment data and transmits the transmission signal.

(5)
The transmission device according to (1), in which the transmission unit transmits the transmission signal with a further reduced influence of reflection noise in the transmission data during data transition on the basis of the transmission data.

(6)
The transmission device according to (5),
in which the transmission unit includes
an adjustment data generation unit that generates adjustment data that reduces the reflection noise after the data transition on the basis of the transmission data,
a timing generation unit that generates timing data indicating a timing at which a waveform of the transmission signal is shaped on the basis of the transmission data, and
a transmission processing unit that transmits the transmission signal on the basis of the transmission data, the adjustment data, and the timing data.

(7)
The transmission device according to any one of (1) to (6), in which the transmission unit transmits the transmission signal via a transmission line to which another transmission device is connected.

(8)
A transmission device including:
a transmission unit that has a function of transmitting a transmission signal with a reduced influence of reflection noise in transmission data during data transition on the basis of the transmission data.

(9)
The transmission device according to (8),
in which the transmission unit includes
a timing generation unit that generates timing data indicating a timing at which a waveform of the transmission signal is shaped, on the basis of the transmission data, and
a transmission processing unit that transmits the transmission signal on the basis of the transmission data and the timing data.

(10)
The transmission device according to (9), in which the timing generation unit generates the timing data by causing the transmission data to be delayed.

(11)
The transmission device according to (10), in which the timing generation unit generates the timing data with a delay element.

(12)
The transmission device according to any one of (9) to (11), in which the transmission processing unit subtracts the reflection noise during the data transition from a waveform of a signal corresponding to the transmission data on the basis of the timing data and transmits the transmission signal.

(13)
A system including:
a plurality of transmission devices that are each connected to a transmission line; and
a reception device that is connected to the transmission line and receives data transmitted from each of the transmission devices,
in which each of the transmission devices includes
a transmission unit that has a function of transmitting, via the transmission line, a transmission signal with a reduced influence of reflection noise in transmission data after data transition on the basis of the transmission data.

(14)
The system according to (13), in which each of the transmission devices reduces an influence of the reflection noise after the data transition to correspond to a positional relationship between the reception device and the other transmission devices in the transmission line.

(15) The transmission device according to any one of (8) to (12), in which the transmission line is a transmission line to which other transmission devices are connected.

(16)
A system including:
a plurality of transmission devices that are each connected to a transmission line; and
a reception device that is connected to the transmission line and receives data transmitted from each of the transmission devices,
in which each of the transmission devices includes
a transmission unit that has a function of transmitting, via the transmission line, a transmission signal with a reduced influence of reflection noise in transmission data during data transition on the basis of the transmission data.

(17)
The system according to (16), in which each of the transmission devices reduces an influence of the reflection noise during the data transition to correspond to a positional relationship between the reception device and the other transmission devices in the transmission line.

REFERENCE SIGNS LIST 100, 200, 300, TX1, TX2, TX3, TX4, TX5 transmission device
102, 202 transmission data generation unit
104, 204, 302 transmission unit
110 adjustment data generation unit
112, 212, 310 transmission processing unit
114, 214, 312 driver circuit
210 timing generation unit
1000 system
B transmission line
RX reception device

The invention claimed is:

1. A first transmission device, comprising:
   circuitry configured to:
   reduce influence of reflection noise in transmission data after data transition, wherein the influence of the reflection noise is reduced based on the transmission data; and
   transmit a transmission signal with the reduced influence of the reflection noise in the transmission data after the data transition.

2. The first transmission device according to claim 1, wherein the circuitry is further configured to:
   generate adjustment data that reduces the reflection noise after the data transition, wherein the adjustment data is generated based on the transmission data; and
   transmit the transmission signal based on the transmission data and the adjustment data.

3. The first transmission device according to claim 2, wherein the circuitry is further configured to:
   generate a plurality of pieces of delay data with different amounts of delay from the transmission data; and
   generate the adjustment data based on the transmission data and the generated plurality of pieces of delay data.

4. The first transmission device according to claim 2, wherein the circuitry is further configured to:
   subtract the reflection noise after the data transition from the transmission data based on the adjustment data; and
   transmit the transmission signal.

5. The first transmission device according to claim 1, wherein
   the circuitry is further configured to transmit the transmission signal with a further reduced influence of the reflection noise in the transmission data during the data transition, and
   the transmission signal is transmitted based on the transmission data.

6. The first transmission device according to claim 5, wherein the circuitry is further configured to:
   generate adjustment data that reduces the reflection noise after the data transition, wherein the adjustment data is generated based on the transmission data;
   generate timing data indicating a timing at which a waveform of the transmission signal is shaped, wherein the timing data is generated based on the transmission data; and
   transmit the transmission signal based on the transmission data, the adjustment data, and the timing data.

7. The first transmission device according to claim 1, wherein
   the circuitry is further configured to transmit the transmission signal via a transmission line, and
   a second transmission device is connected to the transmission line.

8. A transmission device, comprising:
   circuitry configured to:
   reduce influence of reflection noise in transmission data during data transition, wherein the influence of the reflection noise is reduced based on the transmission data; and
   transmit a transmission signal with the reduced influence of the reflection noise in the transmission data during the data transition.

9. The transmission device according to claim 8, wherein the circuitry is further configured to:
   generate timing data indicating a timing at which a waveform of the transmission signal is shaped, wherein the timing data is generated based on the transmission data; and
   transmit the transmission signal based on the transmission data and the timing data.

10. The transmission device according to claim 9, wherein the circuitry is further configured to generate the timing data based on delay of the transmission data.

11. The transmission device according to claim 10, wherein the circuitry is further configured to generate the timing data based on a delay element.

12. The transmission device according to claim 9, wherein the circuitry is further configured to:
    subtract the reflection noise during the data transition from a waveform of a signal corresponding to the transmission data, wherein the reflection noise is subtracted based on the timing data; and
    transmit the transmission signal.

13. A system, comprising:
    a plurality of transmission devices, wherein each transmission device of the plurality of transmission devices is configured to connect to a transmission line; and
    a reception device configured to:
    connect to the transmission line; and
    receive data transmitted from each transmission device of the plurality of transmission devices, wherein
    each transmission device of the plurality of transmission devices includes circuitry configured to transmit, via the transmission line, a transmission signal with a reduced influence of reflection noise in transmission data after data transition, and
    the influence of the reflection noise is reduced based on the transmission data.

14. The system according to claim 13, wherein the circuitry is further configured to reduce the influence of the reflection noise after the data transition to correspond to a positional relationship between the reception device and other transmission devices of the plurality of transmission devices in the transmission line.

* * * * *